United States Patent
Sagemueller et al.

(10) Patent No.: US 10,073,435 B2
(45) Date of Patent: Sep. 11, 2018

(54) REDUCING ERRORS OF A ROTATORY DEVICE, IN PARTICULAR FOR THE DETERMINATION OF COORDINATES OF A WORKPIECE OR THE MACHINING OF A WORKPIECE

(71) Applicant: Carl Zeiss Industrielle Messtechnik GmbH, Oberkochen (DE)

(72) Inventors: Rainer Sagemueller, Aalen (DE); Dominik Seitz, Schwaebisch Gmuend (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 267 days.

(21) Appl. No.: 15/041,111

(22) Filed: Feb. 11, 2016

(65) Prior Publication Data
US 2016/0195869 A1    Jul. 7, 2016

Related U.S. Application Data

(63) Continuation of application No. PCT/EP2014/067410, filed on Aug. 14, 2014.

(30) Foreign Application Priority Data

Aug. 14, 2013 (DE) .................. 10 2013 216 093

(51) Int. Cl.
*G06F 19/00* (2018.01)
*G05B 19/402* (2006.01)
(Continued)

(52) U.S. Cl.
CPC ....... *G05B 19/402* (2013.01); *G01D 5/24428* (2013.01); *G01B 21/045* (2013.01); *G05B 2219/50047* (2013.01)

(58) Field of Classification Search
CPC ........ G05B 19/402; G05B 2219/50047; G01D 5/24428; G01B 21/045
(Continued)

(56) References Cited

U.S. PATENT DOCUMENTS 4,056,722 A * 11/1977 Ray .................. G01D 5/34
                                                        116/DIG. 21
4,392,375 A *  7/1983 Eguchi ............. F02D 11/106
                                                        137/554
(Continued)

FOREIGN PATENT DOCUMENTS

DE    198 15 098 A1    10/1999
DE    199 07 326 A1     8/2000
(Continued)

OTHER PUBLICATIONS

International Search Report for PCT/EP2014/067410, dated Nov. 18, 2014; 3 pp.
Eric Marsh; "Precision Spindle Metrology"; 2008; 26 pp.

*Primary Examiner* — Vu A Vu
(74) *Attorney, Agent, or Firm* — Harness, Dickey & Pierce, P.L.C.

(57) ABSTRACT

A method and apparatus for reducing errors of a rotary device of a coordinate measuring machine or a machine tool. The rotary device comprises first and second parts rotatable relative to one another about an axis of rotation of the rotary device, and a rotational position measuring device for measuring rotational positions of the first part and the second part relative to one another. Errors of the rotary device due to deviations between actual positions and axial alignments relative to ideal positions and an ideal axial alignment are measured over a range of rotary angles. Expected variations in the position of the first part or second part resulting from a deviation of the rotational movement of the rotary device from an ideal rotational movement are established from the
(Continued)

error measurements. Rotational position measurement locations of the rotational position measuring device are established in accordance with the expected variations.

16 Claims, 12 Drawing Sheets

(51) Int. Cl.
*G01D 5/244* (2006.01)
*G01B 21/04* (2006.01)
(58) Field of Classification Search
USPC .................................................. 700/195
See application file for complete search history.

(56) References Cited

U.S. PATENT DOCUMENTS

| | | | |
|---|---|---|---|
| 5,332,956 A * | 7/1994 | Oh ..................... | H02P 23/186 318/635 |
| 5,637,995 A * | 6/1997 | Izawa ................... | G01D 5/145 324/174 |
| 6,410,910 B1 | 6/2002 | Feichtinger | |
| 6,546,643 B2 | 4/2003 | Lotze et al. | |
| 6,714,003 B2 * | 3/2004 | Babin ................... | G01D 3/022 324/166 |
| 6,960,973 B2 * | 11/2005 | Mattson ................. | F02D 9/105 324/207.11 |
| 7,797,981 B2 | 9/2010 | Vasiloiu | |
| 7,830,138 B2 * | 11/2010 | Wolf ..................... | G01D 5/145 324/207.22 |
| 7,948,231 B2 * | 5/2011 | Takahashi ............. | G01D 5/145 324/174 |
| 2002/0029119 A1 | 3/2002 | Lotze et al. | |
| 2003/0141864 A1* | 7/2003 | Babin ................... | G01D 3/022 324/207.12 |
| 2008/0307662 A1* | 12/2008 | Fuchs ................... | G01B 5/008 33/503 |
| 2009/0190283 A1* | 7/2009 | Hammerschmidt ......... | G01D 5/24466 361/240 |
| 2009/0206827 A1* | 8/2009 | Aimuta ................. | G01D 5/145 324/207.25 |
| 2011/0252875 A1* | 10/2011 | Grossmann ............. | F02D 9/10 73/114.31 |
| 2012/0222465 A1* | 9/2012 | Lippuner ........... | G01D 5/24452 73/1.75 |
| 2012/0283978 A1* | 11/2012 | Watanabe .......... | G01D 5/24452 702/94 |
| 2014/0167745 A1 | 6/2014 | Held et al. | |
| 2014/0236520 A1 | 8/2014 | Engel et al. | |
| 2015/0052767 A1 | 2/2015 | Sagemueller et al. | |
| 2015/0052768 A1* | 2/2015 | Wimmer ............. | G01B 21/042 33/503 |

FOREIGN PATENT DOCUMENTS

| | | |
|---|---|---|
| DE | 100 06 753 A1 | 8/2001 |
| DE | 102 33 155 A1 | 2/2004 |
| DE | 10 2012 205 599 A1 | 10/2013 |
| EP | 1 498 691 A1 | 1/2005 |
| EP | 1 923 670 A1 | 5/2008 |
| WO | WO 02/090879 A2 | 11/2002 |
| WO | WO 2011/064317 A2 | 6/2011 |
| WO | WO 2013/007285 A1 | 1/2013 |
| WO | WO 2013/007286 A1 | 1/2013 |

* cited by examiner

REDUCING ERRORS OF A ROTATORY DEVICE, IN PARTICULAR FOR THE DETERMINATION OF COORDINATES OF A WORKPIECE OR THE MACHINING OF A WORKPIECE

CROSS-REFERENCES TO RELATED APPLICATIONS

This application is a continuation of international patent application PCT/EP2014/067410, filed on Aug. 14, 2014 designating the U.S., which international patent application has been published in German and claims priority from German patent application DE 10 2013 216 093.3, filed on Aug. 14, 2013. The entire contents of these priority applications are incorporated herein by reference.

BACKGROUND OF THE INVENTION

The invention relates to a method for reducing errors of a rotary device, which comprises a first part and a second part which is rotatable relative to the first part about an axis of rotation of the rotary device, and a rotational position measuring device for measuring rotational positions of the first part and the second part relative to one another, wherein the rotational position measuring device comprises a rotational position sensor and a measurement body interacting with the rotational position sensor for measuring the rotational position, and wherein the rotational position sensor is connected to the first part and the measurement body is connected to the second part, or vice versa. The invention furthermore relates to an arrangement by means of which the method is implementable. Here, the assumption is made that the errors of the rotary device are reproducible, at least in part.

The invention moreover relates to a method for reducing errors of a rotary device when determining coordinates of a workpiece or when machining a workpiece. The rotary device enables a rotational movement of the workpiece about an axis of rotation of the rotary device while determining the coordinates or while machining the workpiece. The invention furthermore relates to an arrangement by means of which the method is implementable. Here, the assumption is made that the errors of the rotary device are reproducible, at least in part.

It is common practice to rotatably bear workpieces for the purposes of measuring the coordinates thereof or for the purposes of machining the workpiece. By way of example, workpieces are arranged on rotatable tables (so called rotary tables) in the field of coordinate metrology. In this way, the workpiece can be brought into various work alignments, in which the coordinate measuring machine operates, i.e. measures coordinates of the workpiece. In particular, the coordinates of the workpiece can be measured continuously (e.g. in scanning fashion) while the rotary device rotates the workpiece about the axis of rotation thereof.

Corresponding statements apply to the machining of a workpiece by a machine tool. The workpiece can be brought into various work alignments in order to machine the workpiece. In particular, the workpiece can be rotated continuously while it is being machined.

In particular, the work alignment can be defined by a direction that extends perpendicular to the axis of rotation and through a point on the surface of the workpiece, at which the workpiece is sensed or at which the workpiece is machined. Therefore, the force acting on the workpiece during the tactile probing of the workpiece with a probe or during the machining of the workpiece can act, in particular, perpendicular to the axis of rotation in the direction of the work alignment.

In the field of coordinate metrology, for checking the shape of a workpiece, it is often advantageous to sense the workpiece with a probe which has an almost constant work alignment and work position relative to the rotary device while the rotary device rotates the workpiece. The work position and work alignment are not entirely constant, since the workpiece is generally not arranged exactly rotationally symmetrically with respect to the axis of rotation of the rotary device and/or is not, or not exactly, shaped rotationally symmetrically. By way of example, a probe of a coordinate measuring machine, which probes the surface of the workpiece in a tactile fashion, may be held by the coordinate measuring machine in a fixed position and with a fixed alignment, the probe being deflected to a different extent relative to a holder of the probe, depending on the workpiece shape to be measured. Owing to the almost constant work alignment and work position, errors of the coordinate measurement due to position-dependent and alignment-dependent errors of the coordinate measuring machine can be minimized. The errors of the rotary device in this case crucially determine the measurement result. The speed of the measurement of the workpiece can thereby be increased in many cases.

A special measuring problem in the field of coordinate metrology consists in the waviness analysis when checking the shape, particularly of rotationally symmetric areas of workpieces. The deviations of the actual shape from the ideally rotationally symmetric one often exhibit a wavy profile. However, the movement error of the rotary device, by which the real rotational movement of the rotary device deviates from an ideal rotational movement, can lead to the results of the waviness analysis being particularly inaccurate, in particular more inaccurate than results when measuring coordinates of individual surface points of a workpiece.

Corresponding statements apply when machining a workpiece by a machine tool. In a disadvantageous case, waves with particularly large amplitudes may result due to the movement errors of the rotary device, by means of which the workpiece is rotated during the machining, during the sought-after production of a rotationally symmetric area.

In order to reduce the errors of the rotary device, the rotary device may be designed in such a way that the error meets specifications. In particular, it is possible to use air bearings for mounting the rotationally mobile parts of the rotary device, and in the case of motor-driven rotary devices it is possible to use direct drives. The smaller the error of the rotary device is intended to be, the higher is the design outlay.

As an alternative or in addition, errors of the rotary device may be measured with a coordinate measuring machine, a calibration body or an arrangement of calibration bodies being arranged on the rotatable part of the rotary device (for example placed on the rotary table) and measured. Measurement of the errors of the rotary device with respect to all six possible degrees of freedom of the movement using a coordinate measuring machine which can also measure workpieces is, however, time-consuming. If a high accuracy is required, the calibration needs to be repeated, for example when the rotary device is subjected to temperature variations. Corresponding considerations apply for a rotary device which is configured in order to hold workpieces rotatably in the machining range of a machine tool. The outlay for calibration is then usually even greater compared with coordinate metrology, since in the field of coordinate metrology the coordinate measurement machine which subsequently carries out the measurement of workpieces can mostly also be used for the calibration.

Eric Marsh describes in "Precision Spindle Metrology", ISBN 978-1-932078-77-0, in particular Chapter 2, concepts for the description of movement errors of a precision spindle.

WO 2013/007285 A1 discloses an arrangement for measuring coordinates of a workpiece and/or for machining the workpiece, wherein the arrangement comprises a first part and a second part movable relative to the first part, wherein the relative movability of the parts is provided in addition to possible movability of a probe optionally additionally fastened to the arrangement, which movability when mechanically sensing the workpiece for the purposes of measuring the coordinates is given by a deflection of the probe from a neutral position, wherein a measurement body is arranged at the first or second part and at least one sensor is arranged at the other part, i.e. at the second or first part, wherein the sensor is configured to generate a measurement signal in accordance with a position of the measurement body and hence in accordance with the relative position of the first and second part.

WO 2013/007286 A1 discloses a method for calibrating a measurement arrangement for determining rotational positions of a rotary device, which has a first part and a second part rotatable relative to the first part about an axis of rotation.

DE 199 07 326 A1 discloses an angle measuring system for highly precise determination of the angular position of an object rotating about an axis of rotation.

WO 2011/064317 A2 discloses a calibration method, implementable without reference system, for an angle measuring apparatus.

EP 1 498691 A1 discloses a method for correcting the measurement results of a coordinate measuring machine, in which a workpiece is sensed continuously, comprising the following method steps: determining the dynamic bending behavior of the probe as a one-dimensional or multidimensional parameter field, in particular as a dynamics tensor, calculating correction values from the parameter field taking into account the acceleration of the probe, correcting the measurement results with the correction values, wherein the parameter field describes the deviations in the case of acceleration of the probe normally in relation to the workpiece surface.

DE 100 06 753 A1 discloses a rotary/swivel apparatus for probe heads of coordinate measuring machines, comprising at least two rotary joints for aligning the probe heads in terms of angle.

In the field of coordinate metrology, a high precision of rotary devices is required, for example in the so-called roundness check, in which circular contours of workpieces (e.g. the circumferential faces of cylinders) are intended to be checked for deviations from the ideal circular form.

In another case, pitch measurements (i.e. angular distances in a circumferential direction around an axis of rotational symmetry) are intended to be performed in conjunction with the use of rotary devices, e.g. the angular distances of the teeth or flanks on toothed wheels. To this end, very precisely measuring rotational position measuring devices of the rotary device are required, because, otherwise, an equally large measurement error emerges purely due to the error in the rotational position measuring device. However, very precisely measuring rotational position measuring devices are required in other cases in the field of coordinate metrology or of machine tools.

In the case of such a rotational position measuring devices, the so-called eccentric error occurs and supplies a large error contribution. The overall eccentric error is substantially composed of the eccentric error of the rotary bearing for bearing the rotational movement of the rotary device and the assembly error of the rotational position measuring device. It is common practice to largely eliminate the overall eccentric error by adjustment. As a result, the residual error contribution of the overall eccentric error to the overall error of the rotary device can be made to be very small. A further option for reducing the eccentric error consists of respectively arranging a rotational position sensor at positions lying opposite one another in respect of the axis of rotation and of combining the measurement results thereof with one another by calculation in such a way that the eccentric error is eliminated or calculated and subsequently able to be used for correction purposes.

A rotational position measuring device in the field of coordinate metrology often comprises a measurement body, which has a multiplicity of marks distributed about the axis of rotation. The measurement principle is based on the marks subdividing a revolution around the axis of rotation into angular portions with the same size. Deviations from this uniform arrangement of the marks are therefore referred to as graduation errors. Determining the graduation error by separate measurement is possible with corresponding outlay. Once a reference angular position of the measurement body has been determined, the graduation error can be corrected by computation.

In order to reduce the aforementioned eccentric errors from the outset, it is possible to use complicated rotary bearings, which merely bring with them a small eccentric error, for bearing the rotational movement of the rotary device. The outlay for such rotary bearings is high and, nevertheless, generally requires an adjustment in order to further reduce the eccentric error.

If there is less outlay for the rotary bearing of the rotary device, not only is it necessary accept a comparatively large eccentric error but additional movement errors also occur, i.e. unwanted translational and rotational movement components during the rotational movement of the rotary device. In principle, all movement components by which a real rotational movement differs from an ideal rotational movement of the rotary device are unwanted. In the case of an ideal rotational movement, all regions of the rotatable part of the rotary device rotate with the radial position of the region remaining constant in respect of the rotational axis, if a rotational movement occurs. As a result, the axis of rotation of the rotary device is stationary, i.e. it does not carry out translational movements in the direction of the axis of rotation or transverse to the axis of rotation and it does not tilt either. A tilt of the axis of rotation is tantamount to a change in the alignment of the axis of rotation.

Movement errors of the rotary device can be measured and corrected by calculation during a subsequent operation of the rotary device. However, the outlay for the computational correction is very high, in particular because the movement errors often have very small amplitudes. In particular, a correction at the location at which the rotational position measuring device of the rotary device measures the rotational position is very complicated since the movement error merely leads to a rotational position measuring error in the region of fractions of arc seconds. Moreover, known methods for determining the rotational position errors require measurements which may take several hours. Moreover, the temperature can change during this long measurement duration, which in turn leads to a change in the movement error.

A further option for reducing the effects of the movement error on the rotational position measurement consists of using so-called dedicated bearings. These allow the components, arranged at the parts of the rotary device rotatable relative to one another, of the rotational position measuring device (e.g. rotational position sensor and measurement body with marks) to implement the movement errors of the rotary device together. Such dedicated bearings are particularly demanding.

The rotational position measuring error has a particularly strong effect on the error when measuring the coordinates of the workpiece by a coordinate measuring machine or on the machining of the workpiece by a machine tool, particularly if workpieces which have at least regions arranged at a large distance from the axis of rotation of the rotary device are intended to be rotated by a rotary device. If the controller of the coordinate measuring machine or of the machine tool assumes an incorrect rotational position, this has an effect on the coordinate measuring error or on the machining which is proportional to the radial distance. By way of example, rotational position measuring errors of up to one arc second occur in practice, leading to a position error of the workpiece in a direction tangential to the circumferential direction of approximately one micrometer in the case of a radial distance of 0.2 m.

SUMMARY OF THE INVENTION

It is an object of the present invention to specify a method for reducing errors of a rotary device, which reduces effects of movement errors of the rotary device on the measurement of the rotational position. Furthermore, it is an object of the present invention to specify an arrangement for carrying out the method.

The invention proceeds from the basic idea that movement errors of the rotary device, i.e. deviations from an ideal rotational movement, have different effects on the measurement accuracy of the rotational position measurement depending on the rotational position measurement location of the rotational position sensor of the rotary device. If the real rotational movement of the rotary device, compared to the ideal rotational movement, leads to an additional movement in a direction tangential to the rotational direction (i.e. tangential to the circumferential direction about the axis of rotation) of the rotary device, this falsifies the measurement of the rotational position. The component of the movement error relevant to the rotational position measuring device therefore extends in the direction tangential to the rotational direction and is referred to as tangential movement error below and related to the respectively considered location. However, the invention moreover proceeds from the discovery that different movement processes which lead to the movement errors (in particular the tangential movement error as well) of the rotary device superpose one another and compensate or amplify one another, depending on which location of the rotary device is considered. The compensation or amplification has different effects over the course of a rotational movement of the rotary device (in particular over the course of a whole revolution), to be precise in both time and space. There is a change in the compensation or amplification during the course of the rotational movement if a specific location is considered, namely a rotational position measurement location, at which the rotational position measuring device measures the rotational position of the rotary device. As a result, overall, the tangential movement error is spatially dependent on the rotational position measurement location and temporally dependent on the course of the rotational movement having an effect at the rotational position measurement location.

In particular, the amplitudes of the tangential movement error differ over the course of the rotational movement at various possible rotational position measurement locations. As is conventional, the term amplitude denotes the maximum deviation from the ideal rotational movement. However, it is possible not only to consider this amplitude and establish a rotational position measurement location at which this amplitude is small or even at a minimum. Rather, the course of the tangential movement error during the rotational movement can also be considered in a different way and a rotational position measurement location with a particularly advantageous course can be established, wherein "advantageous" may be defined by at least one predetermined criterion. By way of example, there are measurement tasks in coordinate metrology or machining tasks in the machining of workpieces by machine tools, in which attention should be given to precision in respect of a specific order of the deviations between an ideal circular profile of the external circumference or internal circumference of the workpiece. A course with three maxima and three minima of the deviation over a complete revolution about the axis of rotation or over a predetermined range of rotational positions (i.e., in particular, a portion of a revolution) for example has an order of three. Three waves correspond to the three maxima and three minima. Naturally, super-positions of several orders can be present in the description of the tangential movement error as a spatial function (deviation from the ideal rotational movement as a function of the rotational position). The spatial function is equivalent to the temporal function (deviation as a function of the time of the rotational movement) if the speed is known as a function of the time or of the location, e.g. in the case of a constant speed. Nor is the invention restricted to considering the third order. Rather, any orders of the tangential movement error can be considered.

The predetermined criterion can also be referred to as predetermined condition, which is to be satisfied. By way of example, a course of the tangential movement error over the region, which is passed through during the rotational movement, of rotational positions (in particular over a predetermined range of rotational positions) with 9 waves (i.e. 9 maxima and minima of the deviation) or a different predetermined number of waves may be expedient. The concept underlying this is that a different number of waves may occur, depending on the considered angle position of the rotational position measurement, and/or the amplitude of the movement error at the order (e.g. at 9 waves) may have different sizes. In particular, the rotational position measurement location, for example, at which the amplitude of the movement error in respect of a predetermined order is at a maximum is therefore established to satisfy the predetermined criterion.

Returning to the example of the third order, it is desirable in this case for the measurement error of the rotational position sensor to be particularly low due to a third order movement error of the rotary device such that the shape of the workpiece can be measured as precisely as possible. In this case too, the third order is only an exemplary embodiment. A corresponding procedure can be carried out for other orders greater than one, for example by virtue of a rotational position measurement location being established, for which the tangential movement error of the rotary device in respect of the order is small, minimal or satisfies a predetermined condition and therefore a criterion (e.g. it is smaller than a predetermined threshold).

A corresponding procedure can also be carried out for at least one range of orders (e.g. three to five waves) which contains more than one order. Instead of referring to the number of waves of a deviation over one revolution about the axis of rotation of the rotary device or about the axis of rotational symmetry of the workpiece (or the number of waves of a deviation over a predetermined range of rotational positions), it is also possible to refer to the frequency.

In particular, the amplitude of the tangential movement error in the range (i.e. the amplitude of the spatial function or the temporal function, see above) or the amplitude after a transform (in particular a Fourier transform) of the tangential movement error into the frequency space (i.e. the amplitude in the frequency space) can be used as a measure for the tangential movement error over a range of angular positions (in particular a range with all angular positions about the axis of rotation or a portion thereof).

On the basis of the discoveries of the invention described above, it is proposed, for the purposes of reducing errors of a rotary device having a rotational position measuring device, to measure movement errors of the rotary device, i.e. errors of the rotary device due to deviations between, firstly, the real axis of rotation of the rotary device and, secondly, an ideal axis of rotation of the rotary device, and to establish an advantageous rotational position measurement location of a rotational position sensor of the rotational position measuring device. In particular, a rotational position measurement location is established, at which the movement error has a smaller effect, in particular where it is smaller than for other possible rotational position measurement locations, and/or where it satisfies a predetermined condition. In the process it is possible, in particular, to have an underlying predetermined measurement task or machining task, for example as already mentioned above, for which the rotational position measurement location is intended to be advantageous.

By way of example, the movement errors can already be measured when producing the rotary device (e.g. rotary table or rotary joint).

In particular, the following is proposed: A method for reducing errors of a rotary device, which comprises a first part and a second part which is rotatable relative to the first part about an axis of rotation of the rotary device, and a rotational position measuring device for measuring rotational positions of the first part and the second part relative to one another, wherein the rotational position measuring device comprises a rotational position sensor and a measurement body interacting with the rotational position sensor for measuring the rotational position, wherein the rotational position sensor is connected to the first part and the measurement body is connected to the second part, or vice versa, and wherein the method comprises the following steps:

errors of the rotary device due to deviations between, firstly, actual positions and actual alignments of the axis of rotation and, secondly, corresponding ideal positions and an ideal alignment of an ideal axis of rotation of the rotary device are measured over a range of rotary angles, i.e. at different rotational positions of the first part and the second part relative to one another, and corresponding error measurement values are obtained, expected variations in the radial position of the first part or of the second part of the rotary device and/or variations in the position of the first part or of the second part in respect of a direction tangential to the rotational direction of the rotary device, which are generated as a result of a deviation of the rotational movement of the rotary device from an ideal rotational movement about the ideal axis of rotation, are established from the error measurement values for a plurality of rotational position measurement locations of the rotational position sensor, at which rotational position measurement locations the rotational position sensor can measure the rotational position of the rotary device, taking into account the expected variations, at least one rotational position measurement location of the rotational position sensor is established, for which the expected variations in the position in respect of the direction tangential to the rotational direction— are smaller than for other possible rotational position measurement locations and/or satisfy a predetermined condition.

Furthermore, the following is proposed: an arrangement for reducing errors of a rotary device, which comprises a first part and a second part which is rotatable relative to the first part about an axis of rotation of the rotary device, and a rotational position measuring device for measuring rotational positions of the first part and the second part relative to one another, wherein the rotational position measuring device comprises a rotational position sensor and a measurement body interacting with the rotational position sensor for measuring the rotational position, wherein the rotational position sensor is connected to the first part and the measurement body is connected to the second part, or vice versa, and wherein the arrangement comprises the following:

a measuring arrangement, configured to measure errors of the rotary device due to deviations between, firstly, actual positions and actual alignments of the axis of rotation and, secondly, corresponding ideal positions and an ideal alignment of an ideal axis of rotation of the rotary device over a range of rotary angles, i.e. at different rotational positions of the first part and the second part relative to one another, and to output corresponding error measurement values to a prediction apparatus, the prediction apparatus, configured to establish expected variations in the radial position of the first part or of the second part of the rotary device and/or variations in the position of the first part or of the second part in respect of a direction tangential to the rotational direction of the rotary device, which are generated as a result of a deviation of the rotational movement of the rotary device from an ideal rotational movement about the ideal axis of rotation, from the error measurement values for a plurality of rotational position measurement locations of the rotational position sensor, at which rotational position measurement locations the rotational position sensor can measure the rotational position of the rotary device, an establishment apparatus, configured to establish at least one rotational position measurement location of the rotational position sensor taking into account the expected variations, for which rotational position measurement location the expected variations in the position in respect of the direction tangential to the rotational direction— are smaller than for other possible rotational position measurement locations and/or satisfy a predetermined condition.

In the further description, reference is made to the established rotational position measurement location as "advantageous" rotational position measurement location. In particular, the rotational position sensor is arranged and/or aligned in such a way that the established rotational position measurement location is set.

The scope of the invention also includes a method containing the steps of the method for reducing errors of a rotary device, wherein, moreover, when using the rotary device as part of a coordinate measuring machine, a workpiece is measured or, when using the rotary device as part of a machine tool, a workpiece is machined or, when using the rotary device, a workpiece is turned, to be precise before, during and/or after measuring the workpiece by means of a coordinate measuring machine or machining the workpiece by means of a machine tool.

In particular, the prediction apparatus is configured to establish, taking into account the expected variations, an angular position of the rotational position measurement location in respect of the axis of rotation and/or to establish, taking into account the expected variations, an axial position of the rotational position measurement location in respect of the axis of rotation.

In particular, the rotary device is part of a coordinate measuring machine for measuring a workpiece, part of a machine tool for machining a workpiece or is configured to turn a workpiece before, during and/or after the measuring of the workpiece by means of the coordinate measuring machine or the machining of the workpiece by means of the machine tool.

Rotary devices usually have an integrated sensor, which is able to measure the rotational position. By way of example, a known measurement principle is described in EP 1 923 670 A1. According thereto, a general principle of sensing a periodic graduation is that a sensing head with a sensor unit senses one or more graduation periods of a measurement body on the other part of the rotary device. The rotary device is in accordance with the present invention can also have at least one sensor which detects a rotational position of the first part of the rotary device relative to the second part of the rotary device, wherein the sensor, in particular, detects marks on a measurement head which move through the detectable range of the sensor during a rotational movement of the rotary device. Here, the marks can be e.g. dash-shaped marks which extend in the radial direction in relation to the axis of rotation or which extend parallel to the axis of rotation. Corresponding measurement bodies are also referred to as pitch circle disks. Such marks are usually detected with optical sensors. Ideally, a multiplicity of the marks are situated distributed around the axis of rotation at equal angular distances from one another. Alternatively, other marks at the measurement body can be used to detect the rotational movement. By way of example, magnetic marks, e.g. by way of an arrangement with magnetic elements distributed around the axis of rotation, are possible. The corresponding sensor for detecting the magnetic marks can be e.g. a magneto-resistive sensor. However, use can also be made of e.g. Hall sensors or other sensors which are able to detect the magnitude or direction of a magnetic field. However, the invention is not restricted to rotary devices having an angle measuring apparatus which detects marks at a measurement body. Rather, the measurement body can alternatively have e.g. at least one magnet such that a corresponding magnetic field is rotated during the rotational movement of the rotary device about the axis of rotation or, vice versa, a rotatable part of the rotary device is twisted relative to the magnetic field at rest. At least one sensor detects the magnetic field and the rotational position is established therefrom.

The aforementioned actual positions of the (real) axis of rotation of the rotary device and the aforementioned ideal positions of the ideal axis of rotation of the rotary device are not rotational positions that are measured by the rotational position measuring device. Rather, these are positions of a point on the respective axis of rotation in space. Exemplary embodiments for this measurement of position will be described in yet more detail. By way of example, when measuring the deviations of the actual positions from an ideal position, a point of the real axis of rotation (for example at a specific axial position of the axis of rotation) is considered repeatedly during and/or after a rotational movement of the rotary device, i.e. the positions thereof are measured and/or the deviations thereof from the corresponding ideal position of the ideal axis of rotation are measured (e.g. indirectly by way of measuring the positions of at least one point of a body connected to the point on the axis of rotation). Measuring the deviations of the actual alignments of the (real) axis of rotation can, in particular, be implemented by virtue of the deviations of the actual positions of a plurality of points of the real axis of rotation being measured from a corresponding ideal position in each case and the actual alignment being determined therefrom. However, this is only one option. Nor is it mandatory for deviations of the actual alignments of the real axis of rotation from the ideal alignment to be determined explicitly. In accordance with the invention, an error of the rotary device is only measured due to deviations between, firstly, actual positions and actual positions of the axis of rotation and, secondly, corresponding ideal positions and an ideal alignment of an ideal axis of rotation of the rotary device. By way of example, as an alternative to considering two points of the real axis of rotation for measuring the error, it is possible to only consider one point of the real axis of rotation and moreover a point of a body at a distance from the real axis of rotation, wherein the body is connected to the axis of rotation. By way of example, as a measurement body for measuring the error, use can be made of a rotationally symmetric body or an arrangement of rotationally symmetric bodies (e.g. a rod with two spheres), the axis of rotational symmetry of which is aligned, for example, in such a way that it corresponds to the real axis of rotation. Another example is a ball plate with a number of balls which, for example, can be arranged at a distance from one another at the same axial position along the axis of rotation. An even further example is the pitch circle disk of a rotational position measuring system. In this case, use can be made of at least two rotational position sensors of the measurement system, preferably offset from one another by an angular distance of 90°, for measuring the measurement of the rotational movement error. In order to obtain further information about the rotational movement error at a different position of the rotational axis, a measurement can also be carried out there, for example by way of a further rotational position measuring system or using as a measurement body a rotationally symmetric body or a disk with a surface extending in a planar fashion in the direction across the axis of rotation. As an alternative to a rotational position measuring system with a pitch circle disk, use can also be made of a different rotational position measuring system. All that needs to be done during the rotational movement (which optionally can be repeatedly interrupted) is to measure the rotational position at at least two measurement locations preferably offset by an angular distance of 90° from one another. A body which supports part of a rotational position measuring system (e.g. the body which supports the pitch circle disk) can also be used in a different manner as a measurement body for measuring the rotational movement error. By way of example, the body can have a surface extending in a planar fashion in a direction across the axis of rotation and the axial position of the surface can be measured at measurement locations which are at rest during the rotational movement. Alternatively, it is possible to measure the radial positions of an external circumference of the body.

When reference is made here to a body or point connected to the axis of rotation, this means, in particular, that the body or point is part of the rotatable part of the rotary device or it is rotated about the real axis of rotation in the case of a rotation of the rotatable part of the rotary device and that the position and alignment of the body or the position of the point relative to the real axis of rotation or at least relative to a portion of the real axis of rotation remains unchanged in the case of a rotation of the rotary device.

In particular, it is possible to measure and/or establish various movement errors of the rotary device, separated according to error sources and/or separated according to degrees of freedom of the movement of the real axis of rotation. Various error sources are, for example, tilts of the real axis of rotation in various directions and displacements of the real axis of rotation in various directions. Various degrees of freedom of the movement of the real axis of rotation relative to the ideal axis of rotation are, for example, translational degrees of freedom across the real or ideal axis of rotation and in the direction of the real or ideal axis of rotation. By way of example, insights about advantageous rotational position measurement locations can be obtained immediately from the various errors. However, it is also possible to evaluate the expected overall error of the rotary device, e.g. at specific rotational position measurement locations or in regions of possible rotational position measurement locations.

The range of rotary angles of the rotary device in which the movement errors of the rotary device are measured can, in particular, be a whole revolution, i.e. all possible rotational positions are run through. By way of example, the measurement values can be measured in the stationary state, respectively after a rotational movement of the rotary device, or during the rotational movement.

Measured movement errors of the rotary device are obtained by way of the measurements. Expected errors of the rotary device, which are respectively expected for a rotational position measurement location, can now be established from these measured errors. In the process, it is possible, in particular, to interpolate and/or extrapolate between measured error values. Moreover, it is possible to interpolate and/or extrapolate between already established expected error values. As a result, the expected error of the rotational position measuring device, and hence of the rotary device, is respectively obtained, e.g. for a range of possible rotational position measurement locations. From the expected error, which can be equal to the measured error at the measurement points of the error measurement, it is now possible to establish and therefore select at least one rotational position measurement location, at which a rotational position sensor of the rotary device measures the rotational position.

As soon as the movement errors have been measured, it is possible to establish the expected variations, as mentioned above, in respect of the radial position of the first part or of the second part of the rotary device and/or in respect of the position of the first part or the second part in the tangential direction. These radial and tangential variations are equivalent to one another if a corresponding equivalent rotational position measurement location is considered. By way of example, one location of the first part of the rotary device, which lies at a specific angular position about the axis of rotation, and a different location of the part of the rotary device, which lies at an angular position offset by 90° about the axis of rotation, together form complementary locations. Therefore, it is possible to establish the expected tangential movement error at a considered possible rotational position measurement location from the expected or measured radial movement error at a location offset by 90°.

In particular, the movement error can, for example, be measured at a plurality of locations which lie at different angular positions about the axis of rotation and the angular positions of which do not correspond to the angular position of a possible rotational position measurement location. By means of this, it is also possible to establish the expected tangential movement error at the possible rotational position measurement location.

Therefore, the advantageous rotational position measurement location can be established not only directly from the established expected variations of the position in respect of a direction tangential to the rotational direction.

The rotational position measurement location of the rotational position sensor is, in particular, a location at which the other part of the rotary device is situated, i.e. the part at which it is not the rotational position sensor but the measurement body that is arranged. The rotational position is measured at the rotational position measurement location, i.e. the rotational position sensor observes a location at which, depending on the rotational position of the rotary device, different regions or points of the other part of the rotary device are situated. This applies in particular to an optical detection. By way of example, in the case of the aforementioned measurement body with marks, the rotational position sensor detects the mark(s) at the rotational position measurement location. In the case of a measurement body, as likewise mentioned above, which has at least one magnet such that the rotational position sensor establishes the resultant magnetic field and the rotational position therefrom, the rotational position measurement location is, in particular, a location which has the same angular position about the axis of rotation as the location of the rotational position sensor. In particular, the other part of the rotary device passes through the rotational position measurement location during the rotational movement when the rotary device implements the rotational movement thereof. Here, "passing through" should be understood to mean the case where the part at which the rotational position sensor is arranged is considered as a stationary part and therefore a rotational movement of the other part is perceived from the point of view of the rotational position sensor. However, in all cases in which the alignment of the rotational position sensor effective for the rotational position measurement is available independently of the rotational position measurement location, i.e. in cases where it only displaces parallel in the case of a change in the rotational position measurement location, the rotational position measurement location can also be considered to be the location at which the rotational position sensor is arranged. However, in general, the rotational position sensor can be aligned to a different location than a location with the same angular position and the alignment of the rotational position sensor effective for measuring the rotational position can be modified.

Particularly if the rotational position measurement location is a location through which the other part of the rotary device passes during the rotational movement, it can be a approximately punctiform or line-shaped location (e.g. a region extending in a line-shaped fashion in a radial direction in relation to the axis of rotation) or a two-dimensional region, as applies e.g. in the case of an optical sensor which simultaneously comprises a plurality of adjacent marks which follow one another on the measurement body in the circumferential direction about the axis of rotation. In this case, it is possible e.g. to define a point in the two-dimensional area (e.g. the center point thereof in the circumferential direction at a predetermined position in the radial direction), the coordinates of which can be specified as coordinates of the region and hence as coordinates of the rotational position measurement location. It is even conceivable for the rotational position measurement location to be a volume region which is detected by the rotational position sensor. In this case, also it is possible for a point of the volume region established in accordance with rules set in advance to be defined, the coordinates of which point can be used as coordinates of the rotational position measurement location. In any case, the rotational position sensor measures the rotational position of the rotary device by interaction with the measurement body. If the location at which the rotational position sensor is arranged is the rotational position measurement location, the coordinates of which are specified as coordinates of the rotational position measurement location, can be defined in a manner similar to what was mentioned above.

If the rotational position measurement location is known or set, the direction tangential to the rotational direction emerges in accordance with the laws of geometry. The direction is the direction of the tangent at a circle concentric with the ideal axis of rotation, which circle extends through the rotational position measurement location.

As will be explained in still more detail below, the movement error is preferably measured in respect of all degrees of freedom of the deviations between the real rotational movement and the ideal rotational movement, optionally with the exception of the translational degree of freedom in the axial direction. Taking into account the expected variations (see above), this renders it possible to establish not only an angular position of the rotational position measurement location in respect of the axis of rotation, e.g. to establish the most advantageous rotational position measurement location over a revolution around the axis of rotation. Rather, taking into account the expected variations, it is possible alternatively or additionally to establish an axial position of the rotational position measurement location in respect of the axis of rotation, for which the expected variations meet at least one of the criteria mentioned in this description. Preferably, both an angular position and an axial position of an advantageous rotational position measurement location is established from the expected variations, i.e. with these variations being taken into account. This is based on the discovery that a particularly advantageous rotational position measurement location is not present at each axial position in respect of the axis of rotation. The most advantageous rotational position measurement location in a given axial portion of the rotary device is generally a single location, which is defined by the axial position thereof and the angular position thereof.

A further application for measuring the movement errors of a rotary device is described below. This application need not necessarily be a rotary device which has a rotational position sensor, even if this will generally be the case in practice. However, the application described below can be combined with the application of measuring the movement errors described above. Here, the movement errors of the rotary device are first measured and, in particular, with a self-contained measuring system which can optionally be removed from the rotary device after the measurement. In particular, a self-contained measuring system is understood to mean a measuring system which is not part of a coordinate measuring machine which comprises the rotary device or which measures a workpiece to be rotated by the rotary device or which, in a different case, is not part of a machine tool which comprises the rotary device or which machines a workpiece to be rotated by the rotary device. By way of example, for the purposes of performing the measurement of the movement errors with the self-contained measuring system, a measurement body of the measuring system can be coupled to the rotary device such that one or two rotationally symmetric measurement bodies of the measuring system is/are arranged in an approximately rotationally symmetric manner in relation to the axis of rotation of the rotary device such that the measurement can be carried out at two mutually spaced apart axial positions of the axis of rotation. By way of example, distance sensors, which are connected to the other part of the rotary device, i.e. to the part of the rotary device at which the measurement bodies are not arranged, respectively measure the distance of the rotationally symmetric measurement body in two directions extending across one another, which likewise extend across the axis of rotation, at the two mutually spaced apart axial positions. Preferably, variations of the axial position of at least one of the measurement bodies are measured, for example by way of a further distance sensor, such that the five degrees of freedom of the movement error of the rotary device are detected by the self-contained measuring system.

In particular, as will be described in still more detail below, at least one work position and/or one work alignment of a coordinate measuring apparatus of a coordinate measuring machine or of a machining tool of a machine tool are established thereafter, taking into account the results of the measurement of the movement error. The establishment is implemented, in particular, in relation to a workpiece that is intended to be turned by the rotary device. Turning the workpiece can be performed before, during and/or after the measurement of the workpiece by means of the coordinate measuring apparatus or the machining of the workpiece by means of the machining tool. Moreover, the results of the measurement of the movement error of the rotary device are used when establishing an advantageous rotational position measurement location for the rotational position measuring device of the rotary device, in particular as was described above. This means that the measurement results of the movement error are used in two ways, namely for setting the rotational position measurement location and for setting the work position and/or work alignment of the coordinate measuring apparatus or of the machining tool.

It is a further object of the present invention to specify a method for reducing errors of a rotary device when determining coordinates of a workpiece or when machining a workpiece, which method requires little measurement and structural outlay in order to keep the error of the rotary device low in respect of a waviness analysis of rotationally symmetric shapes or in respect of the generation of wave-shaped deviations when producing rotationally symmetric shapes. In particular, the ways of implementing a method for measuring a workpiece or for machining a workpiece already described above should be possible with little outlay. Furthermore, it is an object of the present invention to specify an arrangement for carrying out the method.

The invention is based on the finding that rotary devices, in particular for coordinate measuring machines and machine tools, in many cases have various error sources, which lead to various error contributions to the overall error of the rotary device. In particular, these various error contributions are translational errors, i.e. the axis of rotation moves in a straight-line direction during the rotational movement, and rotational errors, i.e. the axis of rotation is differently inclined relative to the ideal invariant axis of rotation and/or extends differently askew relative to the ideal axis of rotation, depending on the rotational position of the parts of the rotary device that can be moved in rotation relative to one another. The various error contributions compensate one another or amplify one another, depending on the work position and work alignment of the coordinate measuring apparatus or of the machining tool of the machine tool relative to the rotary device. However—as mentioned above—the rotational position sensor which measures the current rotational position of the parts of the rotary device rotatable relative to one another can also implement this measurement more accurately or less accurately. The accuracy depends on whether the various error contributions compensate or amplify one another at the location at which the rotational position sensor measures the rotational position.

Moreover, the invention is based on the finding that individual error sources at specific work positions and work alignments or at specific rotational position measurement locations of the rotational position sensor have a smaller effect on the error of the measurement or on the machining of the workpiece than other work alignments and work positions or other rotational position measurement locations. By way of example, the actual axis of rotation of the rotary device can wobble about a wobble axis that extends perpendicular to the ideal axis of rotation. The wobble movement is a rotational movement of the rotatably movable part of the rotary device about the wobble axis. In the process, the wobble angle (the angle between the real and the ideal axis of rotation) changes during a rotational movement of the rotary device. By way of example, the wobble movement merely has a small effect in the case of a measurement or machining of a workpiece in a work alignment that extends parallel to the aforementioned wobble axis and that is offset in the axial direction of the ideal axis of rotation (i.e. at a different axial position to the wobble axis). The radial position of a workpiece turned by the rotary device does not change in the work alignment. By contrast, however, the radial position of the workpiece changes due to the wobble movement in the case of an alignment of the coordinate measuring apparatus or of the machining tool in the direction that extends perpendicular to the ideal axis of rotation and perpendicular to the aforementioned work alignment at the same axial position as the work alignment. This error of the wobble movement has a stronger or weaker effect, depending on the axial distance from the wobble axis about which the wobble movement takes place (as mentioned above, the axial distance is determined in the direction of the ideal axis of rotation).

Returning to the case, described above, of determining an advantageous rotational position measurement location, the rotational position measurement locations that do not lead to a rotational position measurement error due to the wobble movement lie, however, from the point of view of the axis of rotation, in the direction perpendicular to the ideal axis of rotation and perpendicular to the aforementioned work alignment.

A contribution to achieving the aforementioned object therefore lies in establishing at least one work position and/or one work alignment of the coordinate measuring apparatus or of the machining tool, for which the expected error of the rotary device is small and/or satisfies a predetermined condition. With respect to the rotational position measurement location of the rotational position sensor, a contribution to achieving the object lies in establishing at least one rotational position measurement location, for which the expected error of the rotary device is small and/or satisfies a predetermined condition. The predetermined condition demands, for example, that the error of the rotary device does not achieve or does not exceed a predetermined error value, or it demands a specific order of the waviness (see above). In particular, at least one work position and/or work alignment or one rotational position measurement location can be established, for which the error of the rotary device is smaller than for other work positions and/or work alignments or rotational position measurement locations.

For the establishment of at least one work position and/or work alignment, it is possible, in particular, to take into account a predetermined measurement task for determining coordinates of the workpiece or a predetermined machining task for machining the workpiece. By way of example, the object can set the work alignment of the coordinate measuring apparatus or of the machining tool or set a possible or admissible range for the work alignment. The same can apply to the work position. With respect to the work alignment, two work alignments are, in particular, considered to be identical if they extend parallel to one another, i.e. if they can be made to coincide by a parallel displacement. In particular, the work position can be defined as an axial work position, i.e. the work position is specified as a coordinate value of a coordinate axis (e.g. z-axis) which coincides with the ideal axis of rotation. Particularly in this case, the work alignment can always be defined as extending perpendicular to the ideal axis of rotation in this case, for example if forces when probing a workpiece or machining a workpiece are exerted perpendicular to the ideal axis of rotation.

For the establishment of the at least one rotational position measurement location of the rotational position sensor, it is possible, in particular, to take into account a predetermined measurement task for determining coordinates of a workpiece rotatable with the rotatable part of the rotary device or a predetermined machining task for machining a workpiece rotatable with the rotatable part of the rotary device. By way of example, if, in accordance with the object, a result is to be obtained which, in respect of a rotational symmetry about an axis of symmetry of the workpiece that ideally corresponds to the axis of rotation of the rotary device, has the smallest possible deviation amplitudes in relation to a predetermined order (e.g. an order of three, i.e. three maxima and three minima over a revolution around the axis of symmetry) or in relation to a predetermined range of orders, then the location of the rotational position sensor can be selected in such a way that the rotational position measurement error in respect of this measurement task or machining task is minimal, or satisfies a predetermined condition, at the location.

If this description refers to the rotational position measurement error of the rotational position sensor, the measurement error merely relates to the error component which is based on a movement of the real axis of rotation of the rotary device relative to the ideal axis of rotation of the rotary device. All other error components, in particular the error component of the rotational position measuring device which also occurs in the case of an ideal rotational movement of the rotary device due to an inherent error of the measuring device (e.g. irregularities in the line pitch of a pitch circle disk), the error component due to eccentric positioning of the axis of rotation (in particular due to an eccentric rotatable bearing for bearing the rotational movement of the axis of rotation) and the error component due to an eccentric positioning of the rotatable part of the rotational position measuring device, are not considered in this case.

By way of example, a machining tool may be operated in only a specific work alignment at the machine tool. Accordingly, the movability of a tactile or optical probe of a coordinate measuring machine, by means of which a workpiece is intended to be measured, may be restricted, for example for reasons of reducing the measurement error, in such a way that only one work alignment or a small range of different work alignments is/are possible. Depending on the workpiece to be measured or machined, it may, alternatively or additionally, only be possible to arrange the coordinate measuring apparatus or the machining tool in a specific work position or in a specific range of work positions relative to the rotary device. By way of example, if this relates to a very long workpiece, the end of which is intended to be measured and which is to be aligned in the axial direction of the axis of rotation of the rotary device, the end of the workpiece can be arranged, for example, either very close to a holder of the rotary device or very far away from this holder.

Emphasis should therefore once again be placed on the fact that both the work position and the work alignment relate to the rotary device and not to the workpiece. In respect of the errors of the rotary device, what is usually decisive, exclusively or predominantly, is this work position and/or this work alignment in respect of the rotary device. Moreover, there can also be further influences on the error of the rotary device, e.g. the weight of the workpiece, the inertia of the workpiece, the force which the coordinate measuring apparatus or the machining tool exerts on the workpiece, other parameters from measuring/machining the workpiece (e.g. cut depth of the tool) and/or the rotational speed, with which the rotary device turns the workpiece. In one embodiment of the present invention, at least one of these additional influencing factors and/or any desired combination of these influencing factors can be included in establishing the error of the rotary device at the respective work alignment and/or work position. By way of example, a measurement of the error of the rotary device can be carried out while the respective influencing factor or the respective combination of influencing factors is acting.

In many cases, the translational error of rotary devices has a smaller contribution to the overall error of the rotary device than the rotational error, which can be traced back to a tilt (wobble) of the actual axis of rotation relative to the ideal axis of rotation. Analogous to the principles of the lever in mechanics, the effect of the rotational error increases with increasing distance from the wobble axis (in the axial direction of the axis of rotation). As mentioned above, the wobble angle changes during the rotational movement of the rotary device. Error contributions due to a constant tilt angle that does not change with the rotational movement can be established in a simple manner and, for example, corrected by virtue of the alignment of the real, tilted axis of rotation being modified in such a way that it coincides with the ideal axis of rotation.

Establishing the advantageous work positions and work alignments in relation to the error of the rotary device not only provides the advantage of reduced errors but it can also be determined with particularly low measurement outlay, as is described in the following. Since coordinates of workpieces can be measured, or workpieces can be machined, with reduced error, it is also possible to reduce the construction outlay for the rotary devices.

Preferably, the error of the rotary device is not measured for all possible work positions and/or work alignments of the coordinate measuring apparatus or of the machining tool and/or, preferably, the error of the rotary device is not measured for all work position(s) and/or work alignment(s) which occur/occurs in a given measurement task or a given machining task. Rather, it is preferable for the error of the rotary device merely to be measured for a few rotational positions of the rotary device and merely for a few measurement positions, e.g. two axial measurement positions (in relation to the axis of rotation of the rotary device). At least, the error is measured for each axial position for at least two rotational positions of the rotary device. Alternatively, the error of the rotary device can be measured, for example, at at least one axial position of the axis of rotation in a continuous or virtually continuous manner during a rotational movement of the rotatable part of the rotary device. By way of example, this is possible using capacitive or optical measurement sensors, which measure the position or the relative position of a test body (also referred to as calibration body) rotating together with the rotatable part of the rotary device. Preferably, the error of the axis of rotation is measured in any case in such a way that all error sources or all substantial error sources are taken into account. An error source is substantial if it supplies or can supply a substantial contribution to the overall error of the rotary device.

In particular, the movement error of the rotary device is measured in respect of all degrees of freedom of the deviations between the real rotational movement and the ideal rotational movement, optionally with the exception of the translational degree of freedom in the direction of the axis of rotation. In a portion in the axial direction of the axis of rotation which does not have any rotary bearings that bear the rotational movement, five (or optionally four) degrees of freedom of the movement error are to be detected, namely all three translational degrees of freedom or optionally the two translational degrees of freedom across the axis of rotation and the rotational degrees of freedom in respect of two rotational axes extending across the axis of rotation. The rotational degree of freedom about the axis of rotation is desired and therefore should not be assigned to the movement error. By way of example, such an axial portion of the rotary device can be measured in such a way as will still be explained on the basis of the attached Figures.

One variant consists of measuring the rotational degrees of freedom by measuring the deviations in the axial direction at different points of a measurement body (e.g. a disk-shaped, in particular a rotational symmetric measurement body, at the external circumference of which it is also possible to measure translational degrees of freedom in the radial direction). If different deviations in the axial direction occur at the different points, then this is based on a rotational movement error about at least one rotational axis, which extends across the axis of rotation. As long as nothing else is explicitly mentioned, the axial direction, within the scope of this description, is always understood to mean a direction extending parallel to the axis of rotation or corresponding to the direction of the axis of rotation. By way of example, the disk-shaped measurement body can be an integrated part of a rotary table, for example the disk-shaped part which forms the rotary table surface for carrying the workpiece to be turned. Alternatively, a different rotatable part of the rotary table which, in particular, has a plane surface extending perpendicular to the axis of rotation (e.g. the so-called face chuck of the rotary table) can be used as measurement body. A plane surface of this measurement body or of a different measurement body can have deviations from the ideal plane extent. Known deviations from the ideal plane extent can be corrected before, during or after measuring the movement error of the rotary device, in which the measurement is carried out using the plane surface. In this way, the accuracy of measuring the movement error is improved.

However, if movement errors of the rotary device, relating to an axial portion of the rotary device which has at least one rotary bearing for bearing the rotational movement of the rotary device, are considered and are to be measured, there can be constraining forces due to the rotary bearing. Therefore, depending on these constraining forces, the rotary device may no longer be considered rigid under certain circumstances, as it generally is in axial portions without rotary bearing. Measuring the degrees of freedom of the movement error on one axial side of a rotary bearing can therefore not, or not in all cases, be transmitted to the movement error on the opposite axial side of the rotary bearing. Therefore, under certain circumstances, the movement error should be measured in respect of some or all degrees of freedom of the movement on both axial sides of the rotary bearing of the rotary device before the advantageous rotational position measurement location and/or the work position and/or work alignment can be established therefrom. Alternatively, the movement error can be measured merely on one axial side of the rotary bearing and a rotational position measurement location can be established on this axial side only.

Exemplary embodiments of the measuring arrangement will be discussed in further detail. By way of example, a calibration body for carrying out the method can be arranged at the rotatable part of the rotary device, wherein the calibration body, at at least two different axial positions, has a measurement body that is rotationally symmetric in relation to the real axis of rotation and wherein the radial positions of the measurement bodies are measured in two different, mutually crossing directions, in each case at the axial positions of said measurement bodies, in the case of different rotational positions of the rotatable part of the rotary device. In this manner, it is possible to measure the radial positions dependent on the rotational position directly at the axial measurement positions and it is possible also to establish the tilt of the real axis of rotation relative to the ideal axis of rotation therefrom, for example respectively for the individual rotational positions. Instead of a single calibration body it is also possible to use an arrangement of a plurality of calibration bodies. Instead of the above-described calibration body, it is also possible to use e.g. a different calibration body, e.g. a plurality of calibration balls which are arranged next to one another at approximately the same axial position of the axis of rotation and which are connected to one another, e.g. in the form of a so-called ball plate. Using measurement methods already known per se, it is possible to measure the positions of the ball centers of the balls in space (i.e. the three-dimensional coordinates thereof), to be precise for different rotational positions of the rotary device.

Measured errors of the rotary device are obtained by way of the measurements. From these measured errors, it is now possible to establish expected errors of the rotary device, which are expected in each case for a work position and work alignment of a coordinate measuring apparatus or of a machining tool of a machine tool. In the process, it is possible, in particular, to interpolate and/or extrapolate between measured error values. Moreover, it is possible to interpolate and/or extrapolate between already established expected error values. Overall, what is obtained e.g. for a range of possible work positions and/or for a range of possible work alignments of the coordinate measuring apparatus or of the machining tool is the expected error of the rotary device in each case. From the expected error, which can be equal to the measured error at the measurement points of the error measurement, it is now possible to establish at least one work position and/or work alignment, in particular as already described above in general for the error of the rotary device.

In particular, the following is proposed: A method for reducing errors of a rotary device when determining coordinates of a workpiece or when machining a workpiece, wherein the rotary device enables a rotational movement of the workpiece about an axis of rotation of the rotary device when determining the coordinates or when machining the workpiece, and wherein the method comprises the following steps:
errors of the rotary device due to deviations between, firstly, actual positions and actual alignments of the axis of rotation and, secondly, corresponding ideal positions and an ideal alignment of the axis of rotation (referred to as movement error of the rotary device below) are measured in a range of rotary angles, i.e. at different rotational positions of two parts of the rotary device, which have rotational mobility about the axis of rotation relative to one another, and corresponding error measurement values are obtained,
filtered expected error values of the rotary device are established from the error measurement values, which expected values are expected for a plurality of relative work positions and work alignments of, firstly, a coordinate measuring apparatus for determining the coordinates of the workpiece or a machining tool of a machine tool for machining the workpiece and, secondly, the rotary device, the filtered expected error values being obtained by filtering over at least one predetermined range of the number of waves of the deviations between, firstly, actual positions and actual alignments of the axis of rotation and, secondly, corresponding ideal positions and an ideal alignment of the axis of rotation over a complete revolution or part of a revolution of a rotational movement of the rotary device,
at least one work position and/or work alignment of the coordinate measuring apparatus or of the machining tool is established from the filtered expected error values of the rotary device, for which the filtered expected error value of the rotary device in the case of a predetermined measurement task for determining coordinates of the workpiece or a predetermined machining task for machining the workpiece—
is smaller than for other work positions and/or work alignments and/or
satisfies a predetermined condition.

Moreover, the following is proposed: An arrangement for reducing errors of a rotary device when determining coordinates of a workpiece or when machining a workpiece, wherein the rotary device enables a rotational movement of the workpiece about an axis of rotation of the rotary device when determining the coordinates or when machining the workpiece, and wherein the arrangement comprises the following:
a measuring arrangement, configured to measure errors of the rotary device due to deviations between, firstly, actual positions and actual alignments of the axis of rotation and, secondly, corresponding ideal positions and an ideal alignment of the axis of rotation over a range of rotary angles, i.e. at different rotational positions of two parts of the rotary device, which have rotational movability about the axis of rotation relative to one another, and to output corresponding error measurement values to a prediction apparatus, the prediction apparatus, configured to establish filtered expected error values of the rotary device from the expected measurement values, which error values are expected for a plurality of relative work position and work alignments of, firstly, a coordinate measuring device for determining the coordinates of the workpiece or a machining tool of a machine tool for machining the workpiece and, secondly, the rotary device, namely filtered over at least one predetermined range of the number of waves of the deviations between, firstly, actual positions and actual alignments of the axis of rotation and, secondly, corresponding ideal positions and an ideal alignment of the axis of rotation over a complete revolution or part of a revolution of a rotational movement of the rotary device, an establishment apparatus, configured to establish at least one work position and/or work alignment of the coordinate measuring device or of the machining tool from the filtered expected error values of the rotary device, for which the filtered expected error value of the rotary device in the case of a predetermined measurement task for determining coordinates of the workpiece or a predetermined machining task for machining the workpiece— is smaller than for other work positions and/or work alignments and/or satisfies a predetermined condition.

Each one of the filtered expected error values of the rotary device is valid for one of the plurality of relative work positions and work alignments of the coordinate measuring apparatus or of the machining tool, i.e. it is assigned to one work position, one work alignment or a combination of one work position and one work alignment.

In particular, the established work position and/or work alignment of the coordinate measuring apparatus or of the machining tool is set, i.e. the coordinate measuring apparatus or the machining tool has this work position and/or work alignment after being set.

The optimization of the work position and/or work alignment is advantageous in that the accuracy of waviness analyses can be significantly increased. If the maximum admissible error is very small due to waviness, this error can already be achieved due to a disadvantageous work position and/or work alignment. The invention renders it possible to avoid such a disadvantageous arrangement.

In particular, the measuring apparatus which measures the movement errors of the rotary device can be part of the coordinate measuring machine which has the coordinate measuring apparatus, the advantageous work position and/or work alignment of which is established. By way of example, the coordinate measuring apparatus senses a measurement body, which is arranged at the rotary device, at different rotational positions of the rotary device and at different work positions and/or work alignments and thus establishes the movement errors. Furthermore, the coordinate measuring machine may comprise the prediction apparatus and the establishment apparatus. This applies not only to the calculation of filtered expected error values, but also for a variant of calculating expected error values, which makes do without filtering in accordance with a predetermined range of the order of the waviness or which makes do completely without filtering. Such expected error values can likewise be used to establish an advantageous work position and/or work alignment. With the exception of the step of filtering and the steps connected therewith (such as the transform into the frequency space and the inverse transform), the aforementioned method steps can be carried out in the same manner.

This embodiment of the arrangement or this embodiment of the method solves the following problem: As mentioned above, it is possible to establish errors of a rotary device (e.g. a rotary table, on which a workpiece to be measured can be arranged) and to correct these by calculation during the operation of an arrangement with a coordinate measuring machine and the rotary device. However, there are coordinate measuring machines (and accordingly also machine tools) which do not have a function for the correction by calculation of the errors of the rotary device. In a different case, the costs for the high outlay of the computational correction are to be avoided.

However, according to the invention it is also possible to embody the controller of the coordinate measuring machine in such a way that it can control the functions of the measuring apparatus for measuring the movement errors of the rotary device. In particular, the controller of the coordinate measuring machine can have appropriate software. Furthermore, the controller, once again by way of e.g. appropriate software, can be put into the position of controlling and/or implementing the functions of the prediction apparatus and the establishment apparatus. However, the invention reduces the outlay for reducing the errors of a rotary device not only in this case. Rather, it is possible, in particular, to reduce the outlay for measuring the movement error by virtue of the movement error being measured, as mentioned elsewhere in this description, and the advantageous arrangement of the coordinate measuring apparatus or of the machining tool and/or the advantageous rotational position measurement location being established therefrom. In particular, it is also possible to implement the invention in addition to a preceding computational correction of the errors of the rotary device. As a result of this, a particularly high accuracy is achieved since, in particular, residual errors of the computational correction, which lie in the region of 5% of the overall error, can be reduced even further.

Therefore, by integrating the measuring apparatus, the prediction apparatus and the establishment apparatus, it is possible to overcome the disadvantage that a coordinate measuring machine is not able to receive correction data for correcting the error of the rotary device.

In general, and not only when integrating the measuring apparatus into a coordinate measuring machine, the invention is advantageous in that an advantageous work position and/or work alignment can lie not only where the movement error of the rotary device was measured as well. Rather, expected error values can also be calculated from the measurement values of the movement error for other work positions and/or work alignments. What can be avoided thereby is that only values from the specification of the rotary device which are not related to a specific work position and/or work alignment can be specified as error to be expected. Such error values from the specification are generally very much larger than the actual error values at an advantageous work position and/or work alignment. Particularly in the case of waviness analyses, the error value from the specification of the rotary device is generally very much larger than the actual error of the rotary device in relation to the waviness of a given order. Therefore, by filtering the measured movement error values, it is often possible to find an advantageous work position and/or work alignment, at which the expected movement error is very much smaller than the blanket error from the specification of the rotary device. The possibility of calculating the expected movement error however also helps in the case where a workpiece is intended to be turned by the rotary device during operation of the coordinate measuring machine or the machine tool, which workpiece does not admit an established advantageous work position and/or work alignment of the coordinate measuring apparatus or of the machining tool due to the properties (in particular the shape) of said workpiece or in the case of which workpiece the measuring or machining thereof in the advantageous work position and/or work alignment is not of interest. Therefore, an available and/or, in view of the measurement problem or machining problem, meaningful advantageous work position and/or work alignment can be established without renewed measurement of the movement errors.

In particular, by calculating the expected movement error, it is possible to calculate the difference of the movement error to a work position and/or work alignment, in which the movement error was measured. Another option consists of establishing a list with advantageous work positions and/or work alignments, wherein the expected movement error increases, or in any case does not decrease, along the sequence of the list. The first entry in the list therefore relates to a work position and/or work alignment, for which the expected movement error within the examined range of the rotary device is smallest. If one or more work positions and/or work alignments in the sequence of the list are not possible for implementing a measurement task for measuring a workpiece or a machining task for machining a workpiece, the next possible advantageous work position and/or work alignment can be established from the list.

From calculating the expected movement error it is, however, also possible to estimate the size of the uncertainty of the expected movement error because the advantageous work position and/or work alignment cannot be set exactly when implementing a measurement task or machining task. By way of example, it is possible to estimate how precisely the work position and/or work alignment can be set and the magnitude by which the expected movement error changes thereby.

When establishing the filtered expected error values, it is possible to establish the results of the measurement of the movement error of the rotary device (in particular for an axial position in each case) as a function of the rotational position over a complete revolution or part of a revolution of a rotational movement of the rotary device about the axis of rotation, for example transfer said results into the frequency space by a Fourier transform, filter them in accordance with the at least one predetermined range of the number of waves (e.g. by way of a bandpass filter) and transform them back into the space of the rotational position values. In this way, the filtered expected error values are now available, to be precise for in each case one of the plurality of relative work positions and work alignments. Here, an assigned work position corresponds to the axial position at which the function was established in a manner dependent on the rotational position over a complete revolution or part of a revolution. It is a discovery of the present invention that the filtered expected error measurement values for each combination of a work position and a work alignment (i.e. for each specific arrangement of a coordinate measuring apparatus or of a machining tool) generally differs from all other such combinations or from almost all other such combinations.

Independently of the way of embodying the filtering, filtering is advantageous in that the filtered expected error values, and hence the initial data for establishing the advantageous work position and/or work alignment, substantially only still have error components in the at least one predetermined range of orders. The advantageous work position and/or work alignment is therefore established in relation to the at least one predetermined range. A range of orders is also understood to mean a range which merely contains a single order (e.g. the order 3).

In particular, it is possible to filter the error measurement values not only once in the above-described manner, but a number of times, wherein, in particular, the starting point in each case of filtering is the unfiltered error measurement values. Therefore, it is possible to predetermine different predetermined ranges of orders of waviness for the various filter processes. Various sets of filtered expected error values are obtained and it is possible, for example, to establish an advantageous work position and/or work alignment separately for each result of the filtering. In this manner it is possible, for example, to establish an advantageous arrangement for a first order of waviness (e.g. order three) and an advantageous arrangement for a second order of waviness (e.g. order four). Since the advantageous work positions and/or work alignments generally differ for the various ranges of orders of the waviness, this leads to a measurement of a workpiece by the coordinate measuring apparatus being carried out at different arrangements of the coordinate measuring apparatus, wherein each one of the arrangements is advantageous for measuring the waviness in a different range of orders of the waviness.

In particular, it is possible to specify the error contribution of the movement error of the rotary device in relation to the at least one predetermined range of the order of the waviness for a work position and/or work alignment calculated from the filtered expected error values. Furthermore, it is also possible to establish the overall movement error for the calculated work position and/or work alignment from the error measurement values and consequently it is also possible to establish the error contribution of the movement error outside of the at least one predetermined range of the order of the waviness. Each of these specifications is a quality measure for measuring or machining the workpiece.

The predetermined range or one of the predetermined ranges of the number of waves over a complete revolution or part of a revolution of the rotational movement can also merely contain a wavenumber, i.e. an order (see above). By way of example, this is advantageous if the maximum admissible error for a measurement task or a machining task of the workpiece is particularly small at this order. Usually, the waviness error as a function of the order of the waviness is compared to an error limit function, which likewise depends on the order of the waviness, in the case of waviness analyses of rotationally symmetric workpieces. This error limit function corresponds to the predetermined maximum permissible error. In particular, the amplitude of the waviness is used as a measure of the error. The amplitude therefore corresponds to the maximum variations of the measurement value of a hypothetical or actual sensor, which measures the radial position of the workpiece in relation to the axis of rotation over one revolution of the rotary device.

In particular, a work position and/or work alignment can be established from the filtered expected error values, for which work position and/or work alignment the expected error value is less than, or in an alternative case less than or equal to, the predetermined maximum permissible limit value. Here, the invention is advantageous in that various work positions and/or work alignments of the coordinate measuring apparatus or of the machining tool can be evaluated in respect of whether the assigned filtered expected error value satisfies the predetermined condition. Measuring the rotational movement error of the rotary device can be carried out very quickly in this case compared to other methods for examining errors of the rotary device. By way of example, it is sufficient if a rotationally symmetric measurement body or two rotationally symmetric measurement bodies at different axial positions is/are respectively scanned in respect of a change of the radial position during a revolution of the measurement body or the measurement bodies around the axis of rotation at two measurement points, which e.g. have an angular spacing of 90° around the axis of rotation. Optionally, it is additionally also possible to measure the movement error in the axial direction of the axis of rotation, which is usually referred to as radial runout. By way of example, when using capacitive distance sensors, a rotation of the measurement body or the measurement bodies can be implemented within a few seconds, wherein a multiplicity of measured values respectively corresponding to a different rotational position are produced at a measurement frequency of, for example, a few kHz.

As mentioned above, it is possible to measure and/or establish various movement errors of the rotary device, separated according to error sources and/or separated according to degrees of freedom of the movement of the real axis of rotation. By way of example, insights about advantageous work positions and/or work alignments can be obtained immediately from the various errors. However, it is also possible to evaluate the expected overall error of the rotary device, for example at specific work positions and/or work alignments or in regions of the work position and/or in regions of the work alignment.

In particular, it is also possible to take into account knowledge about the expected shape of the workpiece, the coordinates of which are intended to be measured, when evaluating the expected error values and, in particular, the expected overall error. By way of example, the workpiece may have been produced in a known production method which leads to the expectation of periodic deviations from the ideal rotational asymmetric shape over a substantially rotationally symmetric extent of the surface of the workpiece. By simulating the measurement process of measuring the coordinates or at least parts of the measurement process, it is possible to establish a work position and/or a work alignment of the coordinate measuring apparatus, which renders/render it possible to determine the periodic shape deviations of the workpiece from the ideal shape with little error. By way of example, the measurement problem can demand that it be possible to measure the positions at the surface of the workpiece, for which the largest shape deviations from the ideal shape are expected, with an error that is smaller than a predetermined threshold. Alternatively, it is possible to determine the measurement alignment in respect of the rotary device in which the periodic shape deviations can be measured with the smallest expected error of the rotary device.

In particular, as described above, the at least one work position and/or work alignment can be established by simulating the coordinate measurement or the machining of the workpiece. Therefore, the work position and/or work alignment is ideally established for the respective object. The simulation can be restricted to the movement errors to be expected by the axis of rotation. A workpiece, in particular a real workpiece with shape errors, is not required for the simulation.

In particular, the establishment of the at least one work position and/or work alignment can be based on a measurement task, according to which the surface of the workpiece is sensed by scanning. The (e.g. tactile or optical) sensing by scanning of the workpiece is often used, for example, for measuring almost rotationally symmetric surface regions and it leads to measurement results within a short period of time. In accordance with another measurement task, which may form the basis, it is only coordinates of individual points at a surface of a workpiece that are measured. By way of example, the measurement task can provide for an optical, pneumatic, inductive, magnetic, capacitive and/or tactile probing measurement.

The invention is advantageous in that the measurement of the error of the rotary device is simplified compared to a complete calibration since expected errors are calculated from the measured errors. Therefore, the measurement of the error of the rotary device can be repeated relatively often, for example every time before a workpiece is measured or machined.

In particular, the at least one work position and/or work alignment established from the filtered expected error values of the rotary device is output to a controller of the coordinate measuring device or of the machine tool by an establishment apparatus. Here, it is possible that the establishment apparatus is part of the controller. In this case, there is an output to a further part of the controller, which controls the measurement of the workpiece by the coordinate measuring apparatus or the machining of the workpiece by the machine tool. In this way, measuring of the workpiece or machining of the workpiece can be started automatically after establishing the at least one work position and/or work alignment.

By way of example, the coordinate measuring apparatus is a probe for tactile sensing or optical sensing of the workpiece. Alternatively, this can be a sensor (e.g. a measurement head), which is configured to generate signals in a manner dependent on the measuring of the workpiece, from which signals the coordinates of the workpiece are determinable. By way of example, the coordinate measuring apparatus is part of a coordinate measuring machine. The machining tool of the machine tool can be e.g. a cutting tool or a grinding tool.

The scope of the invention also includes a coordinate measuring machine with the arrangement for reducing the error of a rotary device. In particular, the establishment apparatus can be connected to a controller of the coordinate measuring machine such that the controller can control a measurement of coordinates of a workpiece in accordance with the established at least one work position and/or work alignment of the coordinate measuring apparatus.

As mentioned previously, the invention can be applied in the field of machine tools. Machine tools often have two rotary devices (which are usually referred to as spindles). One spindle rotates the workpiece during the machining. The other spindle permits a rotation of the machining tool. Here, the axes of rotation of the two spindles are often parallel to one another. As a result of the invention, the tool spindle can be brought into an advantageous rotational position (and hence into a corresponding work alignment) and/or into an advantageous work position along the axis of rotation of the workpiece spindle.

In particular, an error map or an error model can be generated from the established filtered expected error values of the rotary device. The map or the model can, for example, be stored in a data memory, which is accessible by the controller of the coordinate measuring machine or of the machine tool. The difference between an error map and an error model consists of the fact that the error values for the respective work positions and/or work alignments are stored in the error map, while an error model contains at least one calculation prescription in relation to how the expected error values can be calculated from information about the error values at desired work positions and/or work alignments. A combination of error map and error model is possible. By way of example, the error model can set how error values contained in the error map are used to determine expected error values for other work positions and/or work alignments. In particular, it is also possible to take into account the aforementioned further influences on the error of the rotary device, e.g. the weight of the workpiece, by way of different error maps and/or error models respectively assigned to the influencing factor or a combination of influencing factors. A combination of error maps and error models is possible in this case, too.

In particular, an error model can contain information about the rotary device (e.g. the rigidity of the bearing of the rotatably movable part of the rotary device) and it can calculate expected error values of the rotary device for at least one work alignment and/or one work position using this information, which error values are to be expected for specific, in particular predetermined objects. By way of example, the error model can thus take into account the change in the work conditions due to forces acting when machining the workpiece or when measuring the workpiece.

In particular, the controller of the coordinate measuring machine or of the machine tool can establish advantageous work alignments and/or work positions in respect of the error of the rotary device and propose these to a user. As mentioned above, the controller can, alternatively or additionally, automatically use these advantageous work positions and/or work alignments for the work process.

In the field of machine tools, the invention is particularly suitable for quickly rotating rotary devices, in particular workpiece spindles, since no compensation of the error of the rotary device, e.g. by appropriate updating of the machining tool, is possible at high rotational speeds.

The invention is also suitable in combination with corrections of the error of the rotary device by calculation. By way of example, the rotary device may have been calibrated and corresponding correction values for correcting the error of the rotary device may have been stored, for example for the access by the controller of the coordinate measuring machine or of the machine tool. In this case, the method according to the invention can establish the expected residual errors for various work positions and/or work alignments, taking into account the corrections, and use these, as already described above, as expected errors of the rotary device.

Instead of correcting the errors of the rotary device by calculation and establishing the expected residual errors by calculation, the measurement of the errors of the rotary device can be carried out taking into account of the corrections and the residual error can be measured in this way. The expected error values can in turn be established therefrom.

BRIEF DESCRIPTION OF THE DRAWINGS

Exemplary embodiments of the invention will now be described with reference to the attached drawing. In the individual figures of the drawing.

DETAILED DESCRIPTION OF THE PREFERRED EMBODIMENTS

Figure 1:
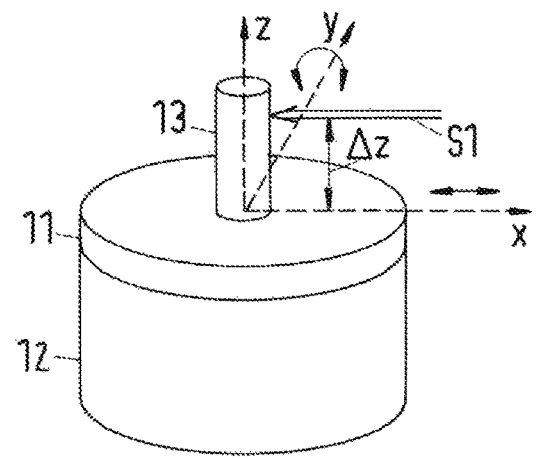
FIG. 1 shows a rotary device, in particular a rotary table, for a coordinate measuring machine, wherein a rotationally symmetric part, in this case a cylinder, is arranged on the rotatable part of the rotary device, the axis of symmetry of which rotationally symmetric part coincides with the axis of rotation of the rotary device, and wherein a specific work position and work alignment, for example of a sensor of a coordinate measuring machine, is depicted schematically.

The rotary device depicted in FIG. 1 comprises a rotatable part 11, which is rotatable relative to a non-rotatable part 12 of the rotary device about an ideal axis of rotation, which in the illustration of FIG. 1 coincides with the z-axis (for example the vertical axis) of a Cartesian coordinate system x, y, z. The actual axis of rotation of the rotary device 11, 12, however, deviates from the ideal axis of rotation since the rotary device is affected by error. An exemplary embodiment of the rotary device will also be explained on the basis of FIG. 20.

FIG. 1 shows a cylindrical part 13, which is arranged on the surface of the rotatable part 11 and the cylinder axis of which is aligned in the direction of the real axis of rotation of the rotary device 11, 12. For the considerations below, the assumption is made that the cylindrical part 13 has no geometrical errors, i.e. it is an ideal cylinder. When a sensor or probe of a coordinate measuring machine, or similarly a machining tool of a machine tool, is aligned at the surface of the cylindrical part 13 in the direction represented by a double-line arrow s1, and when the rotatable part 11 of the rotary device is rotated, and the cylindrical part 13 therefore rotates with it, the error of the rotary device, i.e. the deviation of the real axis of rotation from the ideal axis of rotation, has an effect on the measurement or machining. As will be mentioned in more detail, the error has a different effect as a function of the work position and work alignment of the probe, sensor or tool. In the case illustrated in FIG. 1, the work position along the z-axis of the coordinate system x, y, z is displaced upward by the amount Δz, and extends parallel to the x-axis. As indicated by an arrow pointing in two directions along the x-axis, the error of the rotary device 11, 12 may displace the circumferential surface of the cylindrical part 13 along the x-axis in both directions, i.e. during a complete revolution of the rotatable part 11 the x-position of the surface region of the part 13, at which the probe, sensor or the tool is aligned, varies to and fro in the x-direction.

Figure 2:
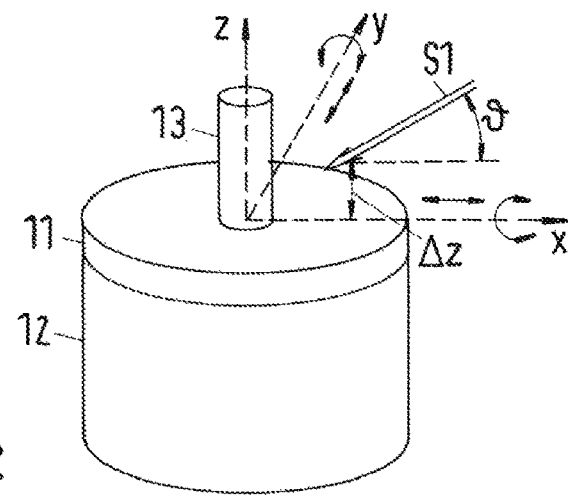
FIG. 2 shows the illustration from FIG. 1, wherein the work alignment and work position of the sensor are selected differently to FIG. 1.

FIG. 2 shows the arrangement of FIG. 1, but with the work alignment changed. In the case illustrated, as in FIG. 1, the work position lies above the xy-plane (this plane is, for example, also the plane of the rotary table surface) of the coordinate system by the amount Δz. The work alignment also extends perpendicularly to the z-axis, but makes an angle ϑ with a parallel to the x-axis. A corresponding plan view is illustrated in FIG. 3.

Both in FIG. 1 and in FIG. 2, it is indicated by curved-line arrows about the x-axis and y-axis, respectively, that the real axis of rotation of the rotary device may tilt (i.e. turn or rotate) about the x-axis and the y-axis while the rotatable part 11 is being rotated.

Figure 3:
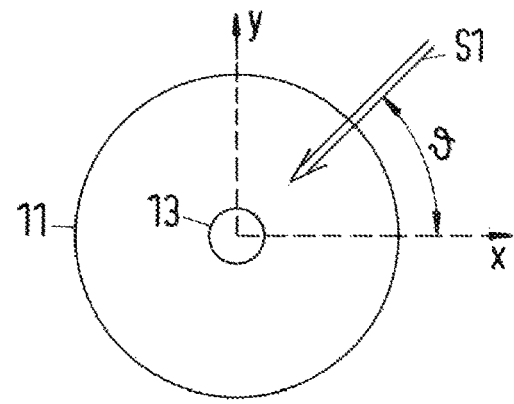
FIG. 3 shows a plan view of the arrangement from FIG. 2 for the purposes of explaining the angle which the work alignment of the sensor includes with a coordinate axis.
Figure 4:
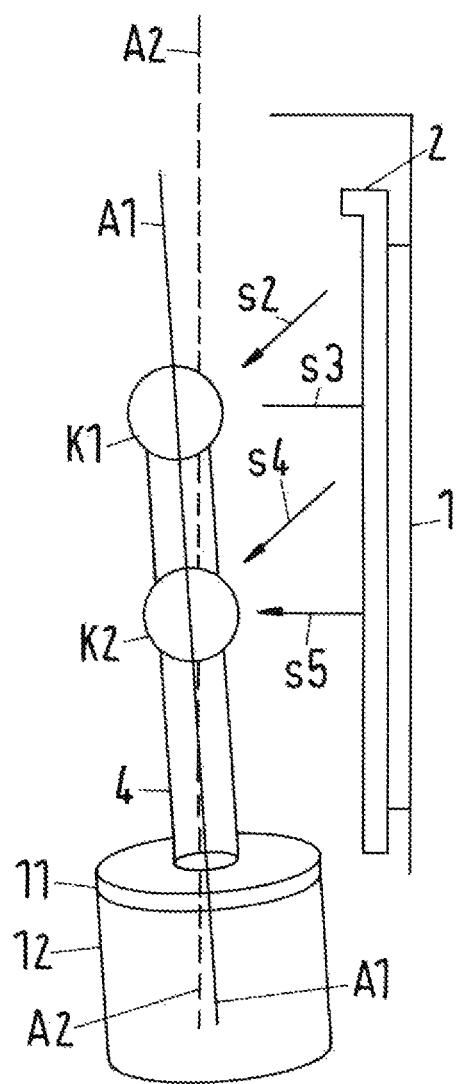
FIG. 4 shows an arrangement with a rotary device, in particular the rotary device in accordance with FIG. 1 to FIG. 3, wherein a calibration body is combined with the rotary device, which calibration body comprises two rotationally symmetric measurement bodies in order to measure tilts and displacements of the real axis of rotation of the rotary device relative to the ideal axis of rotation of the rotary device.

The measurement of the movement error of a rotary device, in particular the rotary device according to FIG. 1 to FIG. 3, is illustrated in FIG. 4. The measuring arrangement comprises four measurement sensors, the measurement directions of which are illustrated by arrows, which are denoted by the reference signs s2, s3, s4, s5. The measurement sensors are not depicted in any more detail, and may for example be fastened on a common holder 2, which is arranged on a stationary apparatus 1. The illustration in FIG. 4 is to be interpreted as being schematic. In practice, different mechanical embodiments of the arrangement are possible.

The measurement sensors with the measurement directions s2, s3 are aligned at a first spherical region K1 of a calibration body 4. The measurement sensors with the measurement directions s4, s5 are aligned at a second spherical region K2 of the calibration body 4. Here, the spherical regions K1, K2 are located at different axial positions along the real axis of rotation A1 of the rotary device 11, 12. From FIG. 4, it can be seen that the real axis of rotation A1 extends at an inclination relative to the ideal axis of rotation A2, or extends askew thereto.

The calibration body 4 in the exemplary embodiment of FIG. 4 is a rod, which extends with its longitudinal axis in the direction of the real axis of rotation A1 and comprises the aforementioned spherical regions K1, K2. The centers of the spherical regions K1, K2 preferably lie on the real axis of rotation A1, as shown in the example of FIG. 4. Alternative calibration bodies are possible. By way of example, a cylindrical body, for example the cylindrical body 13 of FIG. 1 to FIG. 3, may be used as a calibration body, and the sensors may respectively be aligned pairwise at different height positions (or z-positions). Preferably, the sensors are respectively aligned pairwise perpendicularly to one another. This is not mandatory, however, but it does simplify the evaluation of the measurement. Furthermore, it is preferred for the measurement directions of all four measurement sensors to be aligned perpendicularly to the ideal axis of rotation A2. Optionally, a further measurement sensor, which measures the z-position of the upper part of the calibration body (i.e. in FIG. 4 the first spherical region K1), may also be used in addition.

In various rotational positions of the rotatable part 11 relative to the fixed part 12 of the rotary device, for example at angular intervals of respectively 1°, the distance to the spherical regions K1, K2 and/or the position of the spherical region K1, K2, or the surface thereof, is then respectively measured in the measurement directions s2-s5. In this way, the x- and y-components of the overall error of the rotary device at two different z-positions are measured by the four measurement sensors. The translational error and the rotational error of the rotary device can be determined therefrom. The translational error is defined in that it has the same effect over the entire range of possible work positions (or the entire height, here in the z-direction), but depends on the rotational position of the rotatable part. Conversely, the rotational error has a different effect over the entire range of possible work positions. This will be discussed in more detail with the aid of FIG. 5. Both the rotational error and the translational error depend in general on the rotational position of the rotatable part 11. It follows from this that it is not possible to distinguish between the translational and rotational errors of the rotary device with a single measurement sensor or in a fixed work alignment. Conversely, it follows from this that there are work alignments and work positions for which the translational and rotational errors are compensated for better (in terms of lower error values) than for other work positions and work alignments. This will be discussed in more detail.

Furthermore, it is assumed below that the eccentricity and the tilt of the calibration body, as well as of the workpiece, can be taken into account and corrected separately. An ideal rotationally symmetrical calibration body is therefore furthermore assumed.

Figure 5:
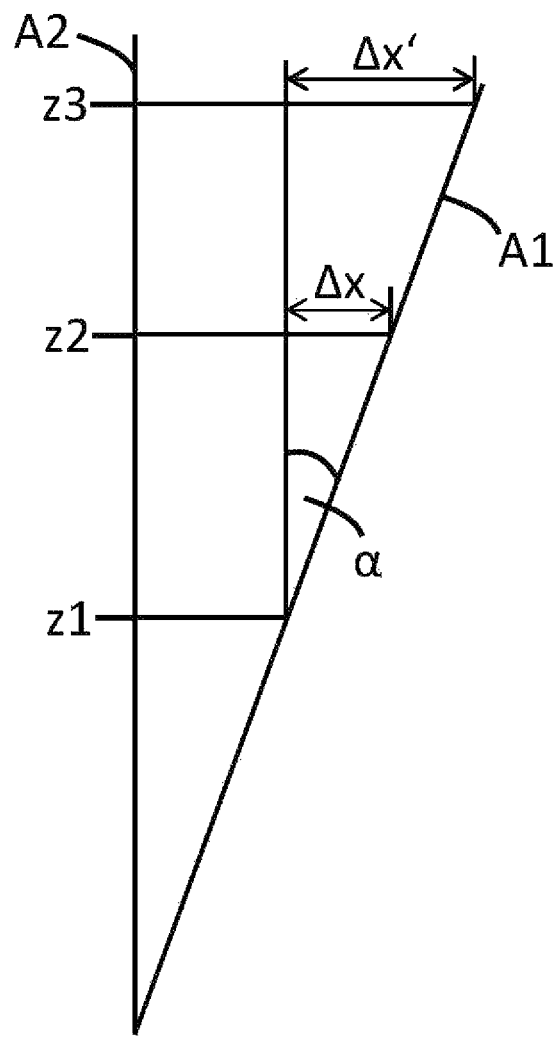
FIG. 5 shows a schematic illustration of geometric conditions of the real and the ideal axis of rotation of a rotary device, e.g. the rotary device in accordance with one of FIGS. 1-4.

From the obtained measurement values of the error of the rotary device, for example, in a first step it is possible to calculate the measurement errors which there were at z-positions other than in the measurement. By way of example, the measurements were carried out as described with the aid of FIG. 4 at the lower two z-positions z1, z2 illustrated in FIG. 5. FIG. 5 shows an illustration in the xz-plane of the coordinate system x, y, z. The real axis of rotation A1, or the projection thereof onto the xz-plane, is inclined relative to the ideal axis of rotation A2 by the angle $\alpha$. Correspondingly, at the position z1, for example, a smaller deviation from the ideal situation (which exists when the rotational movement takes place about the ideal axis of rotation) is established than at the position z2. The difference in the error at the z-positions z1, z2 is $\Delta x$. From this, for a third z position z3, it is possible to calculate the deviation in the x-direction from the ideal situation, as indicated in FIG. 5. In the z-position z3, the deviation $\Delta x'$ from the ideal position is more than at the z-position z1. In this way, both the deviations in the x-direction, as well as in an analogous way the y-direction, can be calculated for the entire relevant range in the z-direction, to be precise according to the following equation for the deviation in the x-direction:

$$x2=x1+\tan(\alpha)*(z2-z1)$$

In the formula, x1, x2 denote the positions in the x-direction of the real axis of rotation A1, or the projection thereof into the xz-plane, z1, z2 denote the z-positions and $\alpha$ denotes the angle illustrated in FIG. 5 between the real axis of rotation A1 and the ideal axis of rotation A2. The equation is not, however, valid only for the two z-positions of the error measurements, but also respectively for any two other z-positions, including a measurement position and a position to be calculated. The calculation of the y-positions is carried out in the same way, by virtue of replacing x2 with y2 and x1 with y1 in the equation, and considering the projection of the real axis of rotation A1 onto the yz-plane. Furthermore, the angle $\alpha$ is replaced by a corresponding inclination angle, which describes the tilt in the yz-plane.

Figure 6:
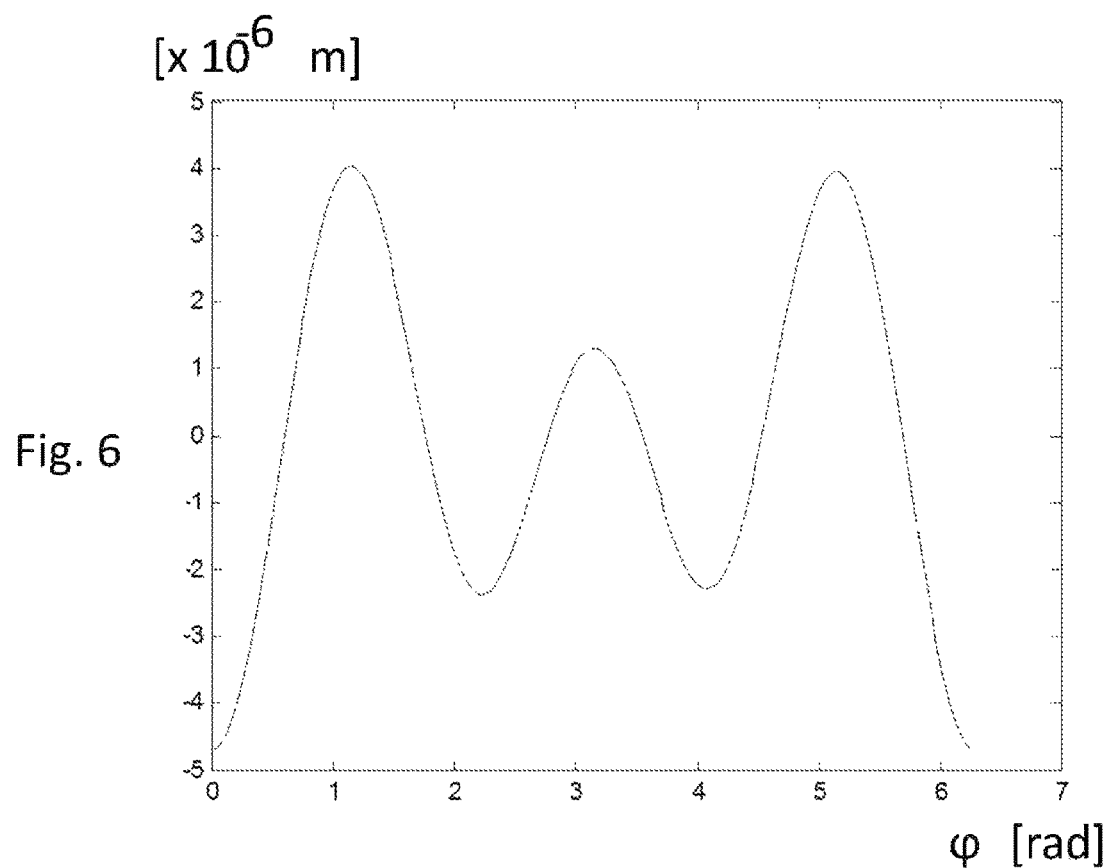
FIG. 6 shows a diagram which depicts the translational error of an axis of rotation in respect to a coordinate axis (e.g. x-axis), which extends perpendicular to the axis of rotation of the rotary device and is part of a stationary coordinate system, as a function of the rotary angle of the rotatable part of the rotary device relative to the stationary part of the rotary device.

In FIG. 6, for example, only the translational movement error of a rotary device in the x direction is represented as a function of the rotational position of the rotatable part (for example of the part 11 in FIG. 1 to FIG. 4). As mentioned, the translational error is of the same magnitude for all z-positions at the respective rotational position.

As shown in FIG. 6, the translational error in the x-direction varies over the course of the rotation of the rotatable part. A complete revolution is illustrated, as can also be identified from the scaling on the horizontal axis. Along the vertical axis, the translational error components in the x-direction are depicted here in a range of between about $-5 \times 10^{-6}$ m to $+5 \times 10^{-6}$ m.

Figure 7:
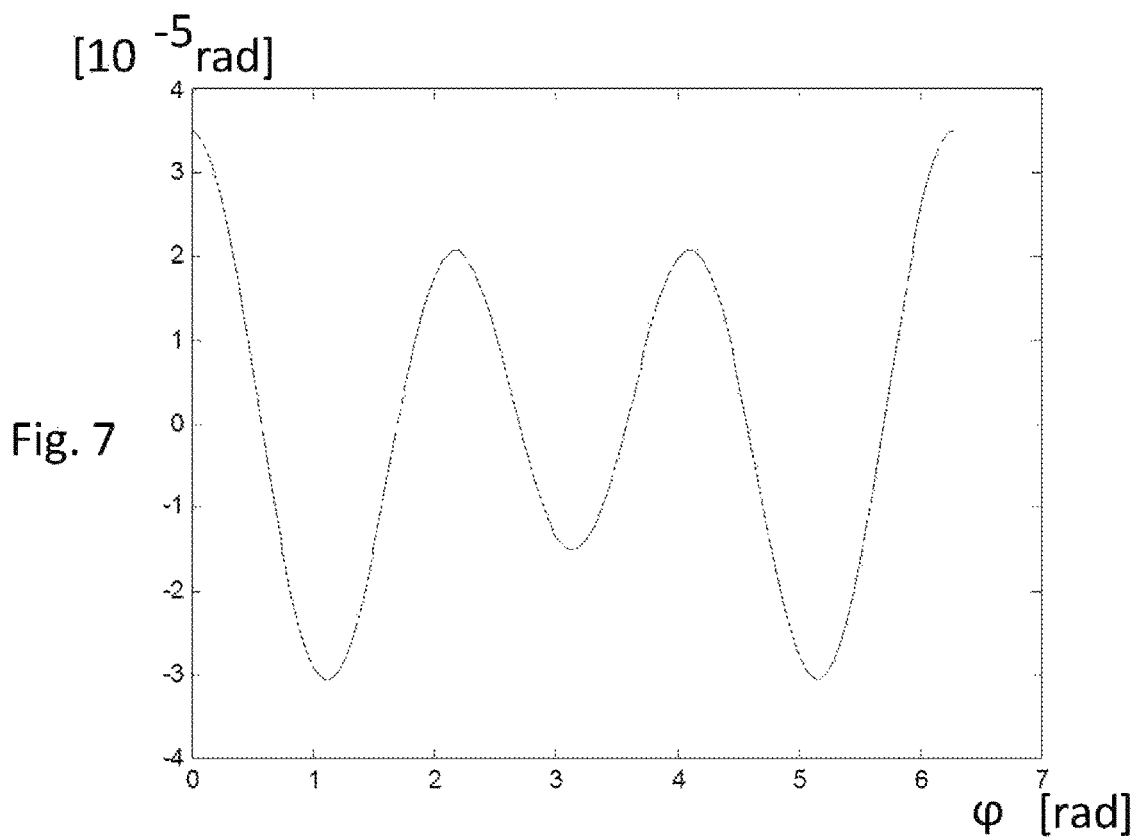
FIG. 7 shows a diagram showing the inclination error (tilt angle) of the real axis of rotation of a rotary device relative to the ideal axis of rotation of the rotary device depending on the rotary angle of the rotatable part relative to the stationary part of the rotary device, wherein only one tilt about the coordinate axis (e.g. y-axis), which extends perpendicular to the coordinate axis (e.g. x-axis), in respect of which the translational error in FIG. 6 is depicted, is considered, i.e. the errors in accordance with the illustrations in FIG. 6 and FIG. 7 can amplify or compensate one another.

The corresponding rotational error, which has an effect in the x-direction (i.e. which is for example attributable to a tilt of the real axis of rotation A1 only about the y-axis) is illustrated in FIG. 7.

As already mentioned above, the translational error does not have a differing effect within the possible range of z-values. On the other hand, the overall error, which is composed of the translational and the rotational error, does vary as a function of the z-position due to the correspondence with the principles of the lever from mechanics. If the work alignment can be described by the z-position only, for example because the work alignment is always directed perpendicular to the ideal axis of rotation, the overall error depicted in FIG. 8 emerges as a function of the z-position, i.e. as a function of the work position which is uniquely describable by the z-position, from the translational and rotational errors depicted in FIG. 6 and FIG. 7. The overall error is in this case specified as the difference between the maximum value and the minimum value of the error over a complete revolution of the rotatable part.

Figure 8:
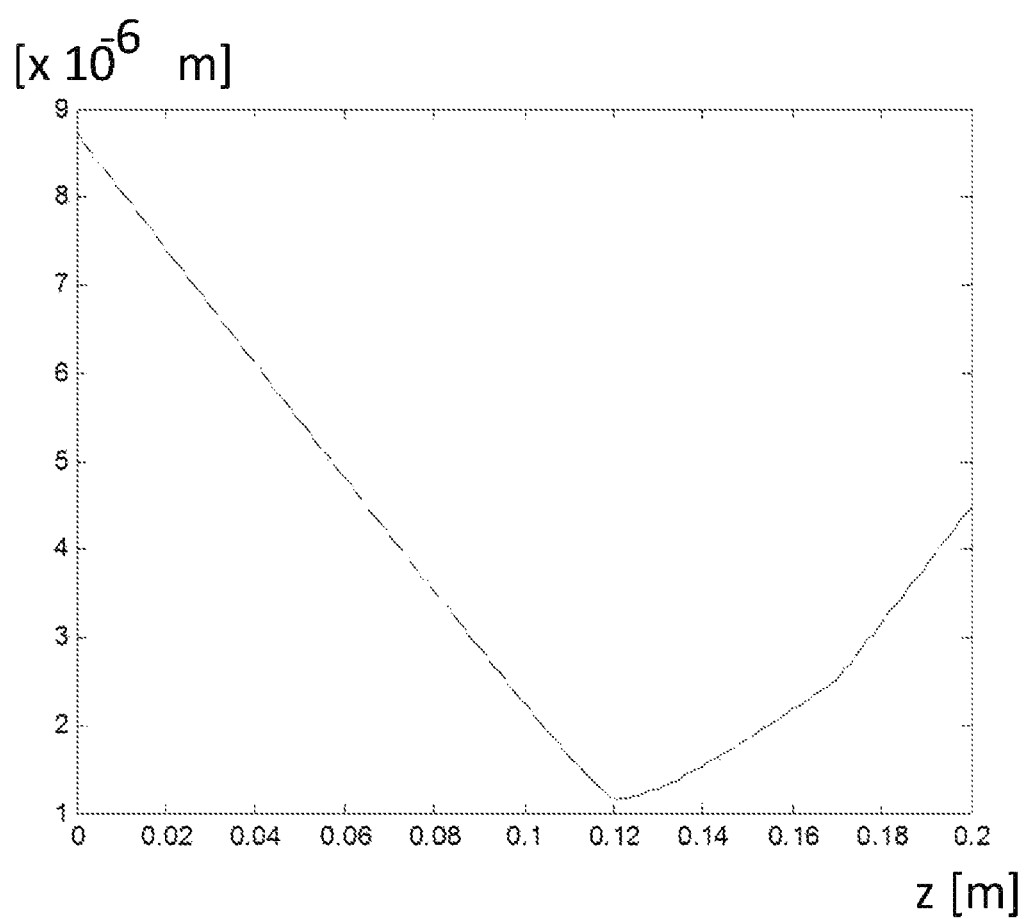
FIG. 8 shows an illustration which depicts the resultant error of the translational error, depicted in FIG. 6, and the rotational error, depicted in FIG. 7, for a complete revolution of the rotary device as a function of the work position along the axis of rotation.

It can be seen in FIG. 8 that, in a range of possible z-positions between 0 and 0.2 m, the overall error lies between values of about $1 \times 10^{-6}$ m and $9 \times 10^{-6}$ m, and has its minimum at about z=0.12 m. When, therefore, only the errors illustrated in FIG. 6 and FIG. 7 occur (i.e. there are no errors which have an effect in the y-direction), or when the work alignment is directed parallel to the x-axis of the coordinate system, the recommendation is to select the work position at the height, or z-position, of 0.12 m. With this work position and the aforementioned work alignment, the error of the rotary device is minimal.

A corresponding statement applies to establishing an advantageous rotational position measurement location, at which the rotational position measuring device measures the rotational position of the rotary device with the minimal movement error. However, it is necessary to take into consideration here that the movement error in the direction tangential to the circumferential direction is responsible for the rotational position measurement error. By contrast, the movement error in the radial direction is decisive in the case of an alignment of the coordinate measuring apparatus or of the machining tool in the radial direction. Therefore, although the same work position in the z-direction is selected for the rotational position measurement location, a position is selected that is offset in the circumferential direction by 90° in relation to the location at which a machining tool aligned in the radial direction, or a coordinate measuring apparatus aligned thus, would be arranged.

The case described above, in which merely errors in the x-direction were considered, is now extended to the general case in which errors can also occur in the x-direction, or the work alignment does not always extend parallel to the x-direction.

Figure 9:
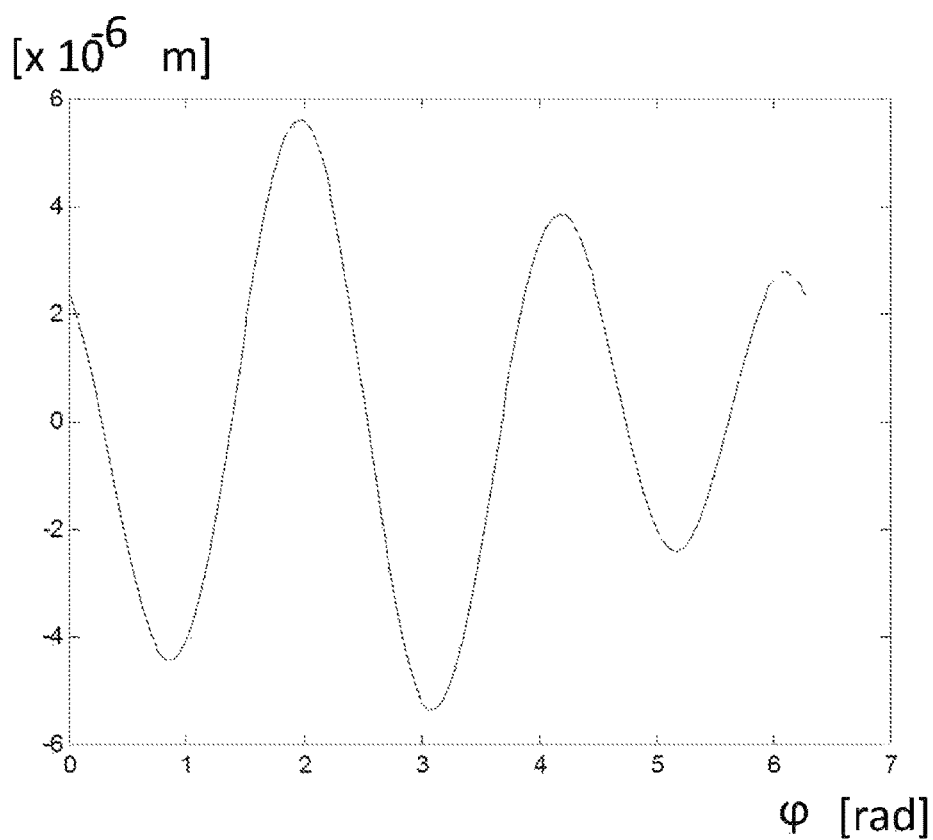
FIG. 9 shows a diagram which shows the translational error of a rotary device like in FIG. 6, but in relation to a second coordinate axis extending perpendicular both to the axis of rotation and the first coordinate axis, as a function of the rotary position of the rotatably movable part.
Figure 10:
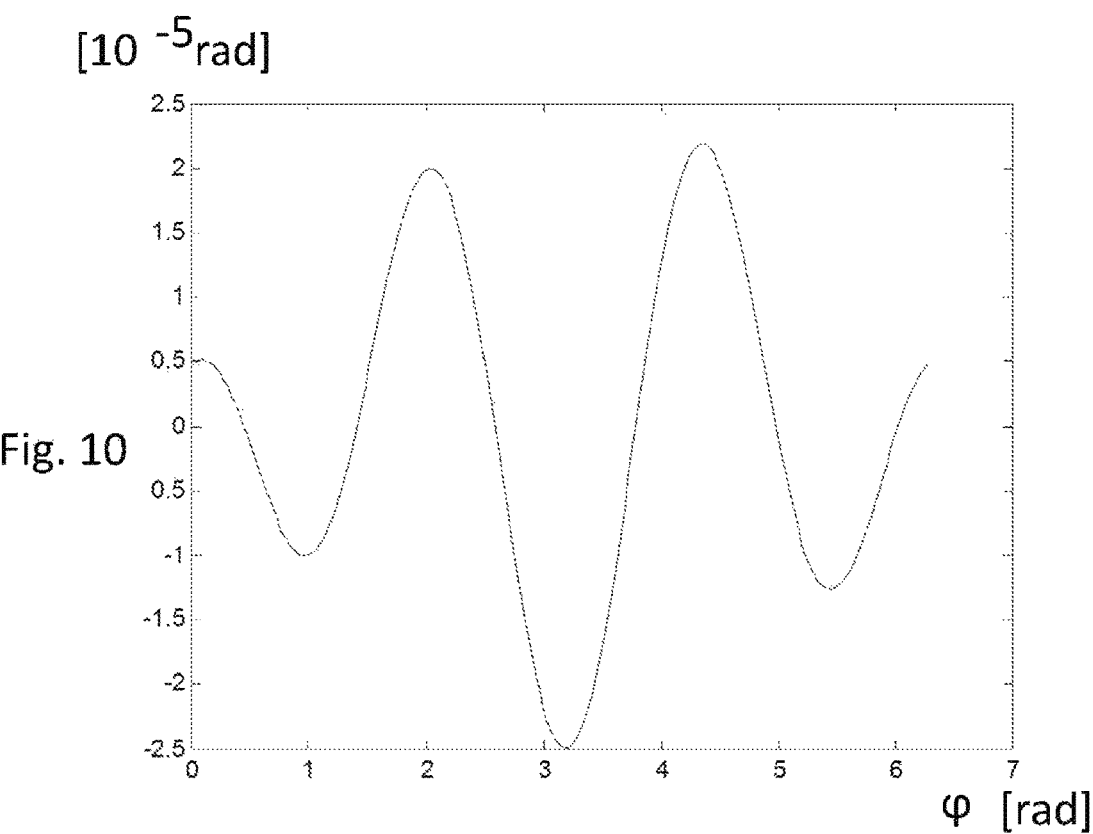
FIG. 10 shows a diagram which shows the rotational error in accordance with FIG. 7, which rotational error can amplify or compensate the translational error depicted in FIG. 9.
Figure 11:
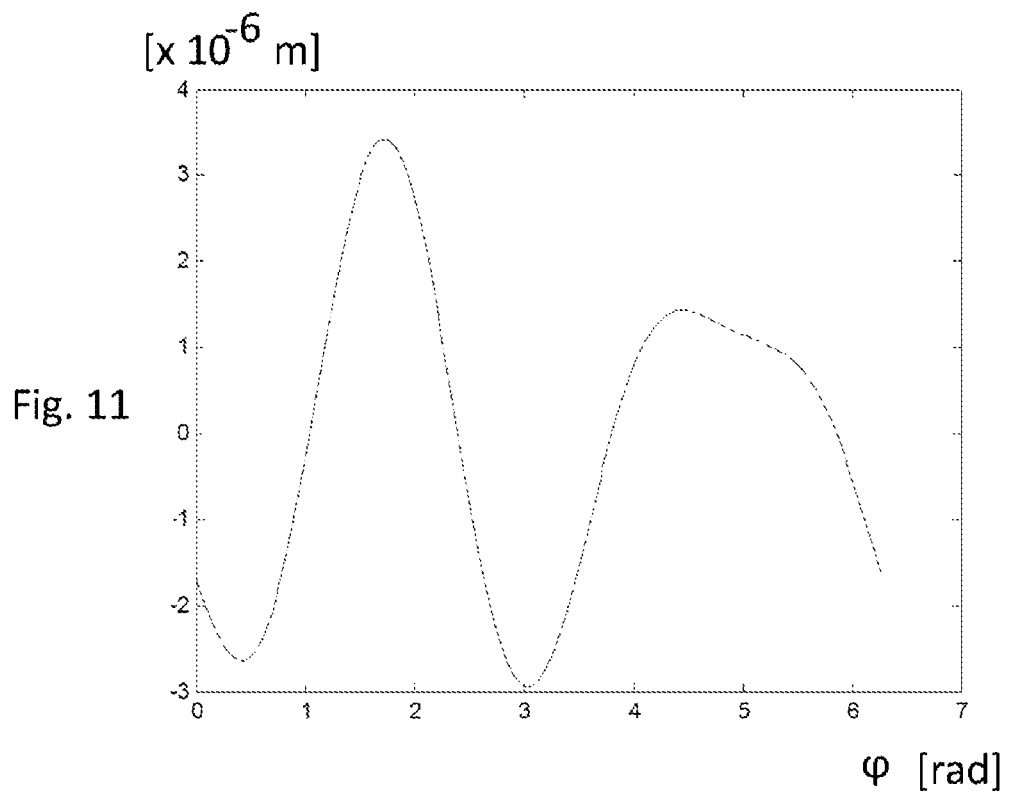
FIG. 11 shows the translational error at a specific work alignment due to the measured translational errors depicted in FIG. 6 and FIG. 9, as a function of the rotational position of the rotatable part of the rotary device.

FIG. 9 and FIG. 10 show the dependencies, corresponding to FIG. 6 and FIG. 7, of the translational error (FIG. 9) and of the rotational error (FIG. 10), which act in the y-direction. In FIG. 11, the overall translational error (i.e. the overall error of the errors depicted in FIG. 6 and FIG. 9) is depicted for a particular work alignment. This overall error can be calculated from the error $s_x$, which acts in the x-direction, and the error $s_y$, which acts in the y-direction, by the following equation:

$$s(\varphi,\vartheta)=s_x(\varphi) \cdot \cos(\vartheta)+s_y(\varphi) \cdot \sin(\vartheta)$$

Here, $\vartheta$ denotes the angle of the work alignment, introduced with the aid of FIG. 2 and FIG. 3, and $\varphi$ denotes the rotation angle of the rotatable part of the rotary device, which is also plotted along the horizontal axis in the diagrams of FIG. 6, FIG. 7, FIG. 9 and FIG. 10, and in further diagrams.

By comparing FIG. 11 with FIG. 6 and FIG. 9, it is possible to identify that the error components in the x-direction and the y-direction partially compensate for one another. In FIG. 11, the error values lie in a smaller range than in FIG. 6 and FIG. 9. This, however, depends on the selected work alignment, i.e. for example the alignment of the probe, sensor or tool relative to the rotary device. The work alignment has been selected as ϑ=45°.

The overall rotational error, which like the overall translational error depends on the work alignment, i.e. the angle ϑ, and also depends on the work position, i.e. the position in the z-direction, can be calculated in a corresponding way.

Figure 12:
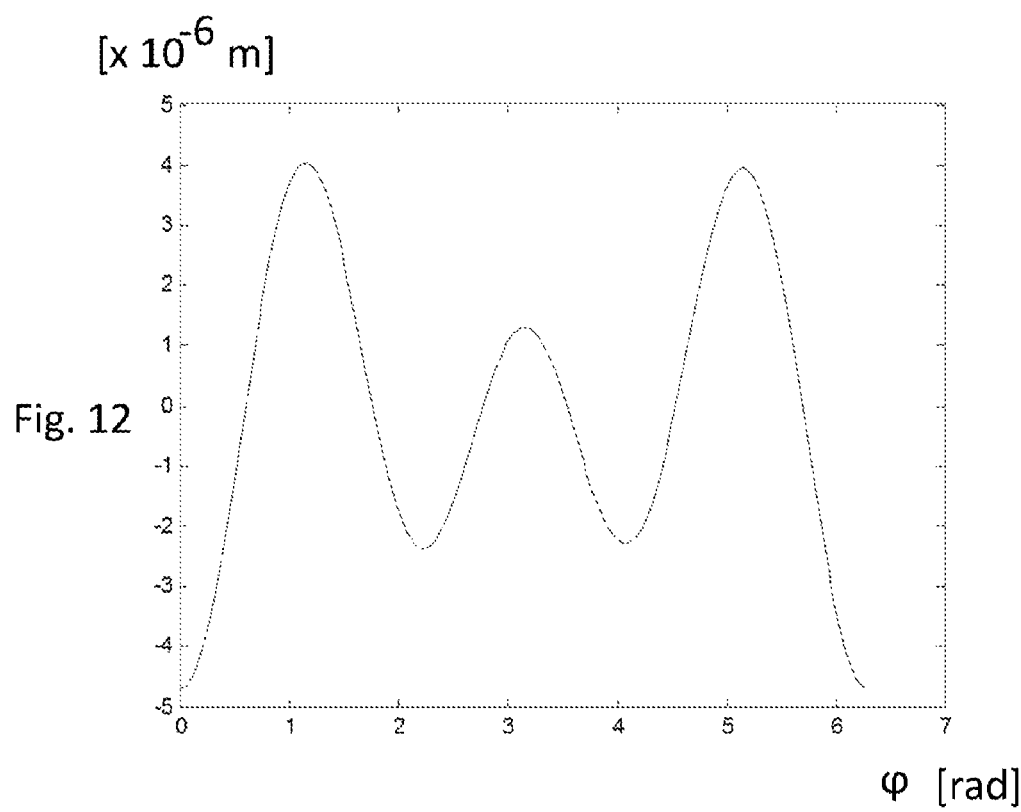
FIG. 12 shows the overall error of the rotary device, i.e. taking account of the translational errors and the rotational errors, for a first work alignment and a first work position as a function of the rotational position of the rotatable part.
Figure 13:
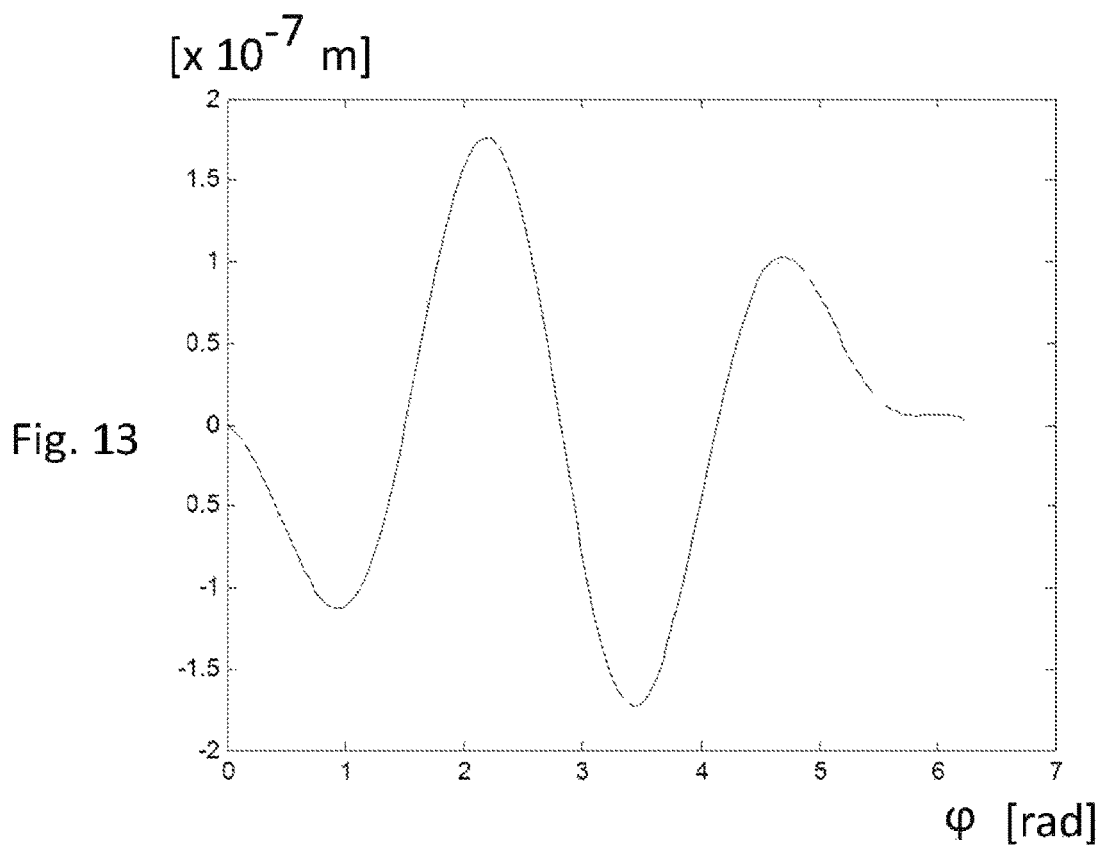
FIG. 13 shows the overall error of the rotary device for a second work alignment and a second work position as a function of the rotational position of the rotatable part.
Figure 14:
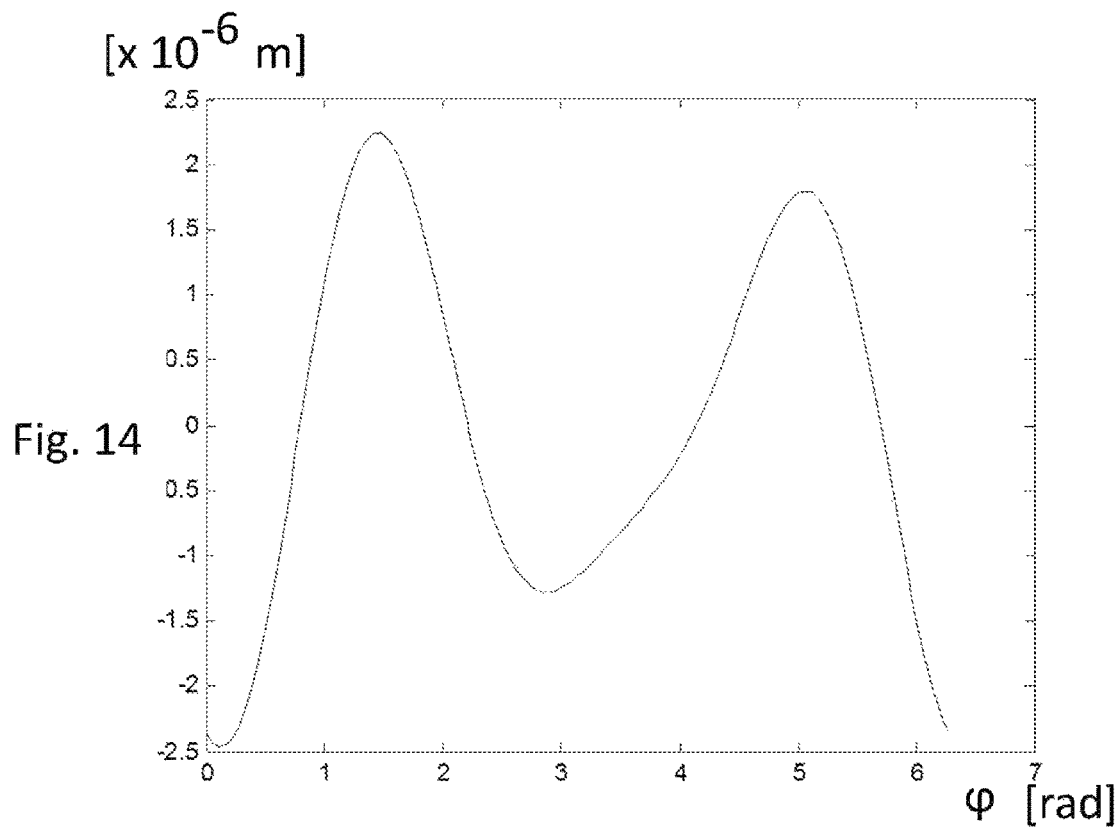
FIG. 14 shows the overall error for a third work alignment and a third work position as a function of the rotary angle of the rotatable part, FIG. 15 schematically shows an arrangement with a rotary device, a measuring arrangement, a prediction apparatus, an establishment apparatus and a controller of a coordinate measuring machine or of a machine tool, FIG. 16 schematically shows a coordinate measuring machine in a portal design, at the probe head of which a tactile probe is arranged and on the base of which a rotary table is arranged.

FIGS. 12 to 14 therefore depict the dependencies of the overall error of the translational errors in the x-direction and the y-direction, as well as the rotation in the x-direction and the y-direction, merely for three selected pairs of work position and work alignment. Since the overall rotational error depends both on the work alignment and on the work position, this also applies for the overall error for rotation and translation. A corresponding statement once again applies for establishing a rotational position measurement location. The work alignment therefore corresponds to a position in the circumferential direction, which is offset by 90° in respect of the axis of rotation.

The work position for the illustration in FIG. 12 is 0 in this example. The work alignment is likewise 0. The overall error varies in a range of 8.7 µm. In the case of FIG. 13, the work position is z=0.144 m. The work alignment is ϑ=3.3 rad. The values of the overall error vary over one revolution of the rotatable part of the rotary device in a range of 0.35 µm. For the result in FIG. 14, the work position is z=0.047 m and the work alignment is θ=0.34 rad. The error values vary in a range of 4.7 µm.

The work position and work alignment belonging to the diagram in FIG. 13 therefore lead to the smallest errors for one revolution of the rotatable part, and would therefore be recommended in comparison of the three possible pairs of work position and work alignment.

The recommendation need not be made in all cases while taking a complete revolution of the rotatable part into account. Rather, measurement tasks or machining tasks may also be envisioned, according to which the rotatable part can be rotated merely over a subrange of one revolution. Different recommendations for work position and work alignment may therefore be obtained than for a full revolution.

Figure 15:
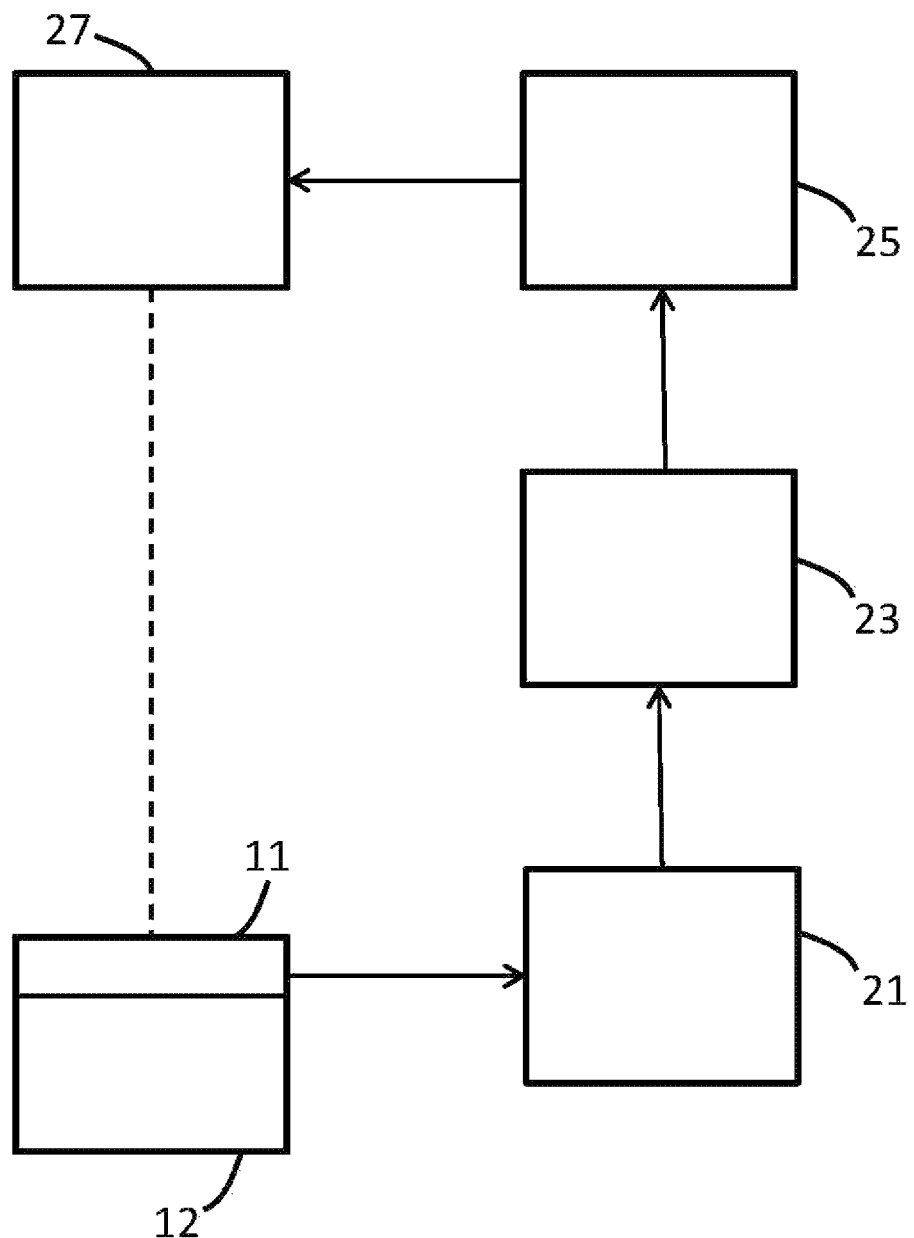

FIG. 15 schematically shows an arrangement comprising a rotary device, for example the rotary device in accordance with FIG. 1 to FIG. 4. A rotatable part 11 of the rotary device can be rotated relative to a non-rotatable part 12. The measuring arrangement 21 is configured in order to measure errors of the rotary device 11, 12 and to deliver corresponding error measurement values to a prediction apparatus 23. This prediction apparatus 23 is configured in order to determine, from the error measurement values, expected error values (in particular filtered expected error values) of the rotary device 11, 12 which are respectively expected for a relative work position and work alignment of a coordinate measuring apparatus for determining the coordinates of the workpiece (not represented in FIG. 15) or of a machining tool of a machine tool for machining the workpiece, on the one hand, and the rotary device, on the other hand. Alternatively or additionally, the prediction apparatus is configured to establish expected error values of the rotary device 11, 12, which are respectively expected for a rotational position measurement location, from the error measurement values. An establishment apparatus 25 is connected to the prediction apparatus 23, and is configured in order to determine, from the expected error values of the rotary device 11, 12, at least one work position and/or work alignment for which the expected error value of the rotary device 11, 12 is advantageous. Alternatively or additionally, the establishment apparatus is configured to establish at least one advantageous rotational position measurement location from the expected error values. The at least one work position and/or work alignment established by the establishment apparatus 25 is delivered to a controller 27 of the coordinate measuring apparatus or to the machine tool, which in particular automatically controls the measurement of a workpiece or the machining of a workpiece with the at least one work position and/or work alignment which has been established. Alternatively or additionally, the established advantageous rotational position measurement location is set.

Figure 16:
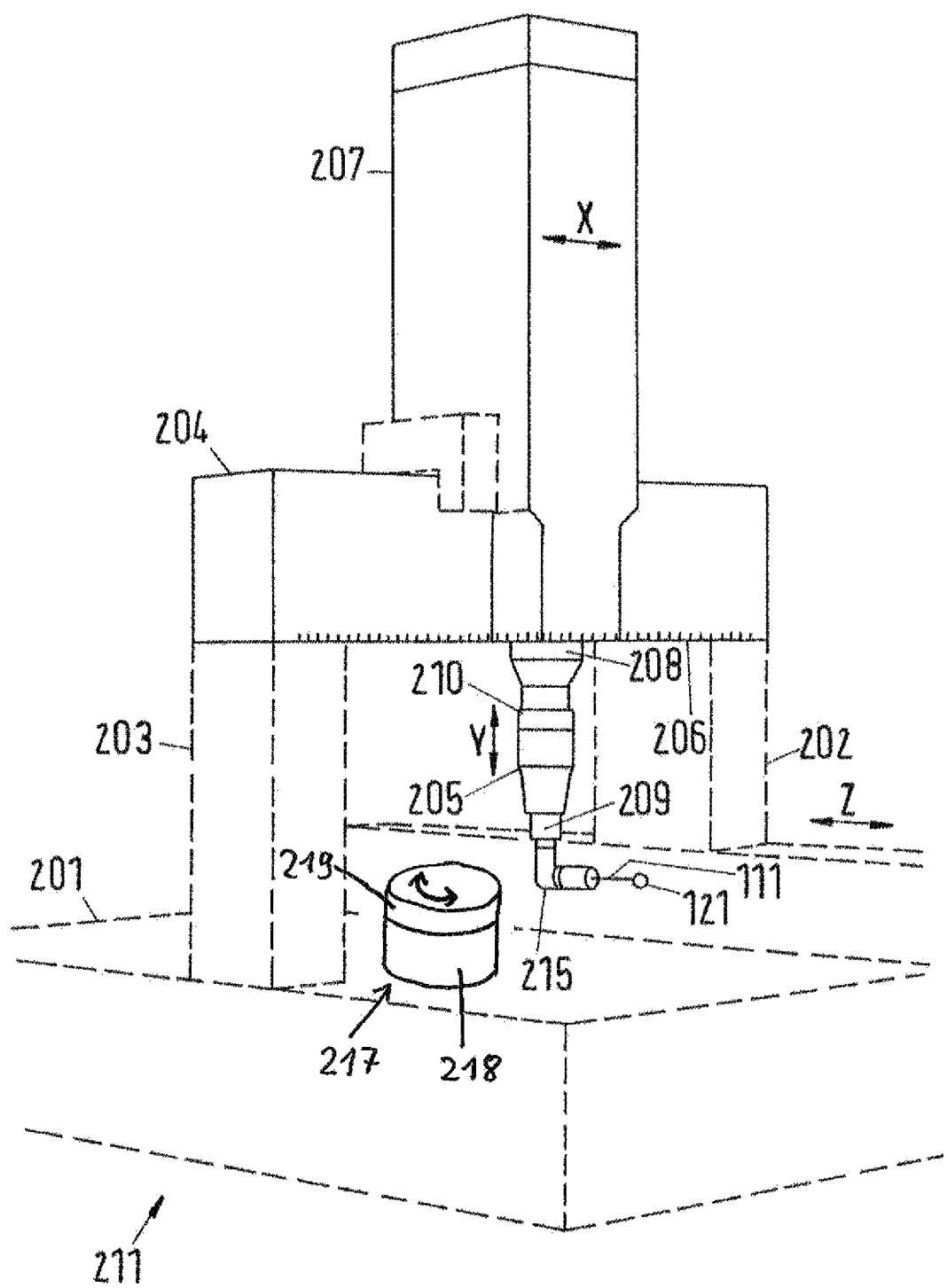

The coordinate measuring machine (CMM) 211 with a portal design, depicted in FIG. 16, comprises a base 201, above which columns 202, 203 are arranged in a manner movable in the Z-direction of a Cartesian coordinate system. Together with a crossbeam 204, the columns 202, 203 form a portal of the CMM 211. At its opposite ends, the crossbeam 204 is connected to the columns 202 and 203, respectively. Electric motors not depicted in any more detail cause the linear movement of the columns 202, 203 in the Z-direction. Here, for example, one electric motor is associated with each one of the two columns 202, 203.

The crossbeam 204 is combined with a cross slide 207, which is movable, by way of air bearings, along the crossbeam 204 in the X-direction of the Cartesian coordinate system. The current position of the cross slide 207 relative to the crossbeam 204 can be determined on the basis of a scale graduation 206. The movement of the crossbeam 204 in the X-direction is driven by a further electric motor. A mandrel 208, which is movable in the vertical direction, is mounted on the cross slide 207 and connected at the lower end thereof to a coordinate measuring apparatus 209 by way of a mounting apparatus 210 and a rotary device 205. The coordinate measuring apparatus 209 comprises an angled probe head 215, on which a stylus 111 with a ball tip 121 is arranged in a removable manner. The coordinate measuring apparatus 209 can be moved relative to the cross slide 207 in the Y-direction of the Cartesian coordinate system, by way of being driven by a further electric motor. The probe head 209 can be brought into virtually any position in the region below the crossbeam 204 by way of the electric motors of the CMM. Furthermore, the rotary device 205 can rotate the probe head 215 about the Y-axis such that the stylus 111 can be aligned in different directions.

A rotary table 217 (i.e. a rotary device) with an integrated rotational position sensor (not depicted in FIG. 16) is arranged on the base 201. The arrangement should be understood to be schematic. In practice, the rotary table 217 will be arranged at a position in which the stylus 111, or a different stylus, can probe a workpiece (not depicted) arranged on the rotary table 217 in the radial direction of the axis of rotation of the rotary table 217 from all sides with as little impediment as possible, i.e. in as many work alignments as possible. A corresponding statement also applies where possible over the whole height range along the extent of the axis of rotation of the rotary device 217 for all work positions of the stylus.

In accordance with the preferred embodiment of the invention, a calibration body, such as e.g. the cylinder from FIG. 1 to FIG. 3 or the double ball rod from FIG. 4, is initially arranged on the rotary device 217. Furthermore, a separate measuring device, for example as depicted schematically in FIG. 4, comprising at least the sensors s2 to s5 is arranged and used to measure the movement errors of the rotary device. Here, the sensors, and also the at least one rotational position sensor of the rotary device, are preferably connected to the controller of the coordinate measuring machine such that the measured values from the sensors, and also of the at least one rotational position sensor, are detected by the controller and are able to be assigned to one another. Each measured rotational position corresponds to at least one measured value of one of the sensors s2 to s5. Conversely, each one of the measured values of the sensors s2 to s5 is assigned to a rotational position. If it is only the work alignment at a fixed work position that is intended to be determined in an axial direction, the use of two sensors, e.g. the sensors s2 and s3, which measure at the fixed work position is sufficient.

The controller of the coordinate measuring machine can now calculate the expected error values and/or the filtered expected error values for the various work positions and/or work alignments and establish therefrom at least one advantageous arrangement of the coordinate measuring apparatus or, alternatively or additionally, an advantageous arrangement of a machining tool for the use of the rotary device in combination with a machine tool.

Alternatively or additionally, the controller of the coordinate measuring machine can establish at least one advantageous rotational position measurement location of the rotational position sensor of the rotary device from the expected error values or from the filtered expected error values. In this case, not only in the case of the exemplary embodiment described here, but in general in relation to the invention, the aforementioned expected variations of the radial position of the first part or of the second part of the rotary device and/or variations in the position of the first part or the second part in relation to a direction tangential to the rotational direction of the rotary device correspond to the expected error values or the filtered expected error values. Expected variations are expected errors.

The coordinate measuring machine with a portal design is merely one exemplary embodiment of a coordinate measuring machine, the coordinate measuring apparatus of which is intended to be arranged in an advantageous manner in accordance with the invention. Therefore, it is also possible to use coordinate measuring machines with different designs, e.g. a gantry design or an articulated arm design.

In the following, examples of rotational position measuring devices which measure the rotational position of a rotary device are explained. By way of example, the rotational position measuring device can be integrated into the rotary device such that the rotational position measuring device is completely enclosed by components of the rotary device and thus protected from external influences (as shown in e.g. FIG. 20). By way of example, the rotary device can be a rotary table, as shown in the example of FIG. 16. Alternatively, this can relate, for example, to a rotary joint with at least one axis of rotation. By way of example, such rotary joints are used in coordinate measuring machines where the sensor or probe of the coordinate measuring machine is connected by way of the rotary joint to other parts of the coordinate measuring machine such that the rotary joint can bring the sensor or probe into a desired rotational position. In particular, the rotary joint can also have two axes of rotation, which e.g. extend perpendicular to one another. Preferably, a rotational position measuring device is available for each one of the axes of rotation.

Figure 17:
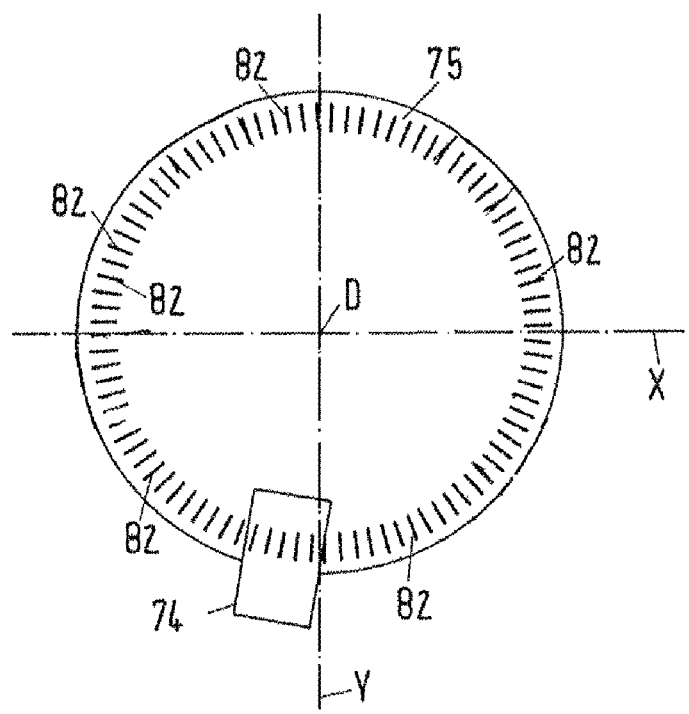
FIG. 17 shows a plan view of a measurement body and a rotational position sensor of a rotational position measuring device.

The top view of a rotational position measuring device in FIG. 17 shows a measurement body 75, which has a multiplicity of dash-shaped marks 82 which, in the exemplary embodiment, extend in the radial direction in relation to an axis of rotation D of the rotary device, i.e. perpendicular to the axis of rotation D. Ideally, the angular spacing of the dash-shaped marks 82 is constant; for example, the angular spacing would therefore be 1° in the case of 360 marks. Such an arrangement of dash-shaped marks on a measurement body is referred to as pitch circle disk below. FIG. 17 furthermore shows an X-axis and a Y-axis of a coordinate system, wherein the X-axis and the Y-axis extend perpendicular to one another and perpendicular to the axis of rotation D in each case. Furthermore, a rotational position sensor 74 is depicted, said rotational position sensor being arranged above the pitch circle disk in the axial direction of the axis of rotation D, i.e. in front of the pitch circle disk in the viewing direction of FIG. 17. In practice, more than one such sensor may be present. The optical detection region of the sensor obtains one or more of the dash-shaped marks 82 simultaneously. In particular, the detection region is a region with approximately five marks 82, which lie directly below the rectangular region representing the sensor. The marks 82 pass through the detection region in succession with the rotational movement of the rotary device. The sensor 74 is arranged at a first part of the rotary device (not depicted), while a second part of the rotary device has the pitch circle disk. The first and second parts of the rotary device are rotatable relative to one another about the axis of rotation D. In the depicted exemplary embodiment, the rotational position measurement location of the sensor 74 is, in particular, the location at which the sensor 74 is arranged. Since the sensor 74 has a detection region on the pitch circle disk which is imaged by a projection of the pitch circle disk onto the sensor 74 in a direction parallel to the axis of rotation, it is alternatively also possible to define the location of the detection region as rotational position measurement location. In each case, the coordinates of a central point of the rotational position measurement location are used as coordinates of the location, for example of the point in the center of the detection region in the circumferential direction of the pitch circle disk at the radial distance from the axis of rotation, which lies in the center of the marks 82.

Other designs of pitch circle disks are also possible, in particular with dash-shaped marks which extend parallel to the axis of rotation D in a linear manner along the external circumference of a disk-shaped body. Furthermore, corresponding designs having not line-shaped marks but magnetic marks are possible. In this case, the sensor 74 does not detect dash-shaped marks in an optical manner, but rather the magnetic field which changes due to the passing of magnetic marks.

Figure 18:
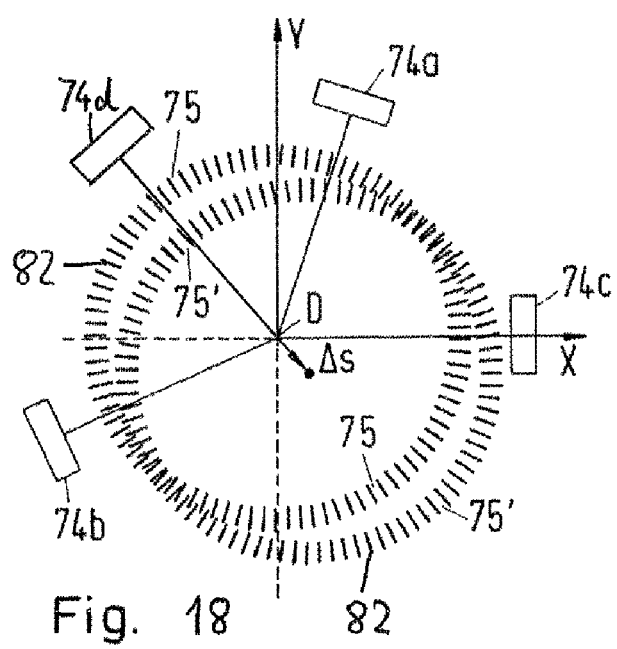
FIG. 18 shows the displacement of the measurement body, in particular from FIG. 17, in a direction across the axis of rotation of the rotary device.

FIG. 18 shows the measurement body 75, i.e. the pitch circle disk in accordance with FIG. 17 or a different pitch circle disk, in two different positions. The pitch circle disk is denoted by the reference sign 75 in a first position, while it is denoted by the reference sign 75' in a second position. However, the rotational position sensor should be arranged not over, but radially outside of the pitch circle disk. Four possible rotational position measurement locations of the sensor 74 are denoted by the reference signs 74a, 74b, 74c, 74d. At the position 75, the axis of rotation D lies in the center of the pitch circle disk. By contrast, the pitch circle disk is displaced by a translation vector Δs in the position 75'. As a result of the displacement, which is the result of a movement error during the rotational movement of the rotary device, the pitch circle disk has been displaced by translation relative to the rotational position measurement locations 74*a*, 74*b*, 74*c*, 74*d* in a direction extending across the axis of rotation D, that is to say perpendicular to the plane of the figure in FIG. 17 and FIG. 18. It can easily be identified that the displacement has a different effect at the various rotational position measurement locations. While completely different marks 82 would be detected in each case by the sensor at the rotational position measurement locations 74*a*, 74*b* and 74*c* depending on the position at which the pitch circle disk is situated, a sensor at the rotational position measurement location 74*d* detects the same mark 82 with its detection region directed in the direction of the axis of rotation D, independently of the position in which the pitch circle disk is situated. By contrast, if the displacement were to occur in a direction within the plane of the pitch circle disk, which extends perpendicular to the displacement depicted in FIG. 18, a sensor at the rotational position measurement location 74*d* would observe the largest change in the position of the marks 82. This change causes the error when measuring the rotational position.

The above-described example merely elucidates the effect of a translational movement. However, such translational movements and additional rotational movements of the rotary device occur during a rotational movement of the rotary device, as described above. Depending on the rotational position measurement location, these movements compensate or amplify one another in different ways. In the most advantageous case—although this is not to be expected in practice—all translational and rotational movements compensate one another at a rotational position measurement location over a complete revolution of the rotatably movable part of the rotary device around the axis of rotation.

The preceding exemplary embodiments show the case where the pitch circle disk or the measurement body of the rotational position measuring device rotates, while the part at which the rotational position sensor is arranged is at rest. However, these thoughts are also applicable analogously to the reverse case. If the rotational position sensor is moved around the axis of rotation and in the process exposed to movement errors due to the superposition of various translational and rotational movements, corresponding errors are created when measuring the rotational position.

Figure 19:
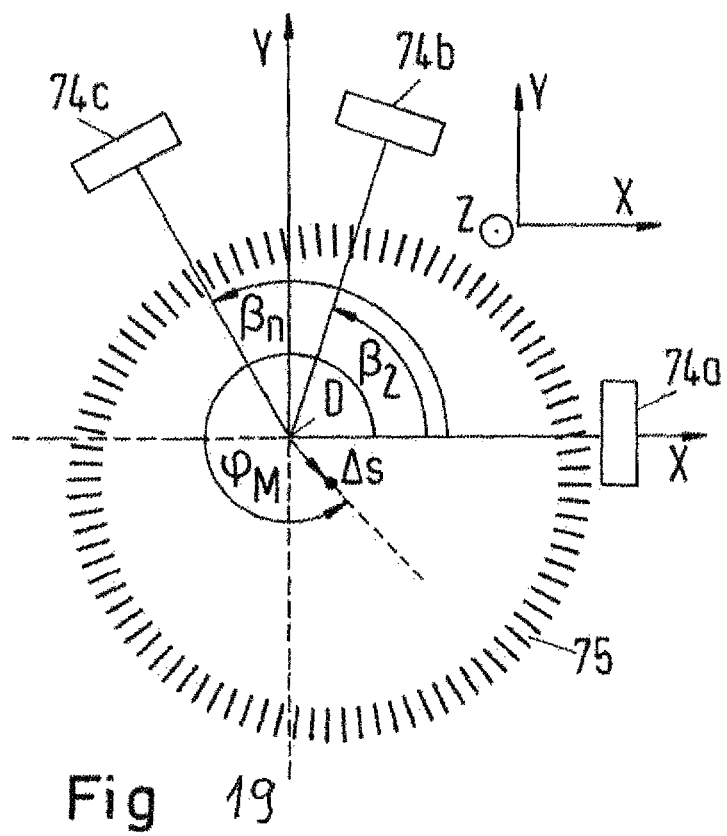
FIG. 19 shows a measurement body of a rotational position measuring device with a plurality of possible rotational position measurement locations, wherein a coordinate system and angle positions are defined.

FIG. 19 shows the pitch circle disk 75 from FIGS. 17 and 18, or a different pitch circle disk. Once again, the pitch circle disk 75 is displaced relative to the axis of rotation D by the translation vector Δs. Furthermore, angular positions of possible rotational position measurement locations 74*a*, 74*b*, 74*c* of the rotational position sensor in respect of the X-axis are depicted. The angular position of the first rotational position measurement location 74*a* is zero, i.e. the rotational position measurement location lies on the X-axis. The second rotational position measurement location 74*b* is rotated in the circumferential direction of the axis of rotation D against the X-direction by the angle β2. The third rotational position measurement location 74*b* is rotated in the circumferential direction of the axis of rotation D in relation to the X-axis by the angle βn. The sensor is aligned to the axis of rotation D at each rotational position measurement location. Top right, a point in the circle indicates that the direction of the Z-axis, and hence of the axis of rotation D, extends perpendicular to the image plane.

Furthermore, an angular distance φM is depicted (once again in relation to the X-axis), which describes the direction of the translation vector Δs in relation to the X-axis. By specifying the values of this angle φM and the magnitude of the translation vector Δs, it is possible to uniquely describe the translational movement in a plane perpendicular to the axis of rotation D, which the pitch circle disk 75 has carried out from the ideal position thereof (in which the axis of rotation D lies in the center of the pitch circle disk 75).

FIG. 19 elucidates that a displacement of the pitch circle disk across the direction of the axis of rotation D or, in a different case, a displacement of the rotational position measurement sensor across the direction of the axis of rotation D leads to displacement of the reference point of the rotational position measurement device. However, as a result thereof, the rotational position measurement device loses the required unique assignment of the reference point thereof in relation to the coordinate system of the rotary device. In FIG. 19, only the coordinate system of the rotational position measuring device is illustrated.

The unique geometric assignment of the coordinate systems of firstly, the rotary device and, secondly, the rotational position measuring device can easily be re-established by taking into account an angle difference in relation to the axis of rotation. Such an angle difference is also referred to as offset angle and provided in known rotary devices with rotational position measuring devices. If this location is now selected after establishing an advantageous rotational position measurement location, it is possible to establish a corresponding offset angle and therefore likewise possible to establish the required unique relationship between the two coordinate systems. The offset angle of the rotational position measurement location is the angle difference about the axis of rotation between the rotational position measurement location and the reference point of the rotational position measuring device (e.g. angle difference β2 for the location 74*b*). The previously mentioned offset angle for permanent displacement, e.g. due to an eccentric error, can be added thereto.

Figure 20:
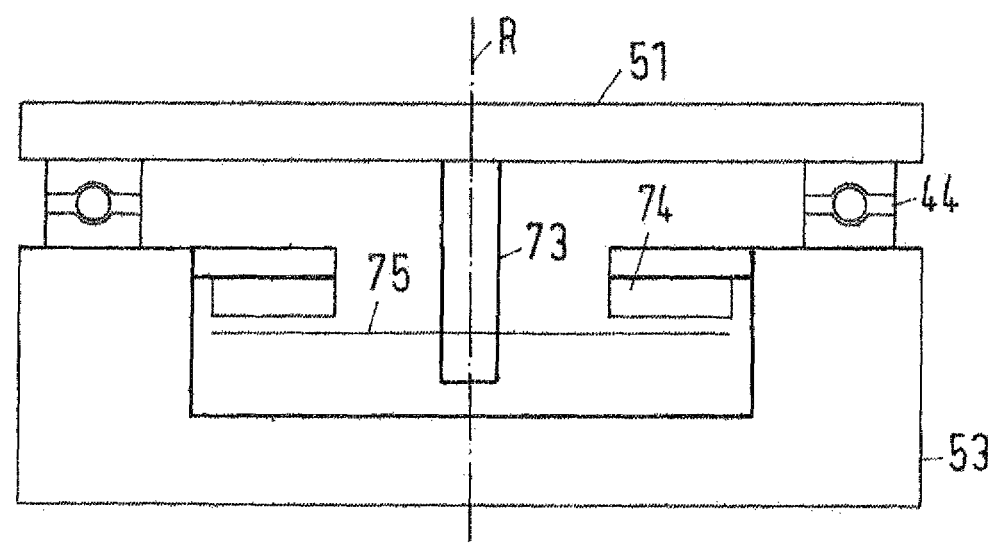
FIG. 20 shows an axial section through a rotary device with an integrated rotational position measuring device.

A rotary device with an integrated rotational position measuring device is now described on the basis of FIG. 20. Here, this is an embodiment with a particularly low profile, i.e. the extent along the axis of rotation R is particularly small. The pitch circle disk 75 of the measuring system, which may be, for example, the pitch circle disk in accordance with one of FIGS. 17-19, is arranged at the lower end of a rod-shaped support 73 of the rotor 51. The rotor 51 (which, for example, can be referred to as first part of the rotary device) is coupled to the stator 53 (which, for example, can be referred to as the second part of the rotary device) in a rotatable manner by way of a rotary bearing 44, which is a ring bearing. A rotational position measuring location, at which a rotational position sensor 74 is arranged, lies radially inward in the direction of the axis of rotation R as seen from the stator 53, i.e. it lies in an interior of the stator 53. The rotational position measurement location is established in the manner according to the invention.

The design of a rotary device depicted in FIG. 20 is advantageous in this case in that the rotatably movable part (the rotor 51) is predominantly situated above the rotary bearing 44 of the rotary device. Therefore, it is possible to measure the movement error of the rotary device by virtue of a test body being arranged on the rotor 51 (e.g. as was explained on the basis of FIG. 4) and deviations from the ideal position of the test body being measured at various rotational positions. Furthermore, this design is advantageous in that the measurement body of the rotational position measuring device (in this case: the pitch circle disk 75) is connected to the rotor 51, but projects downward. It is therefore possible to establish an advantageous rotational position measurement location below the rotary bearing 44, even though the movement error is only measured above the rotary bearing 44.

The invention claimed is:

1. In the operation of a coordinate measuring machine for measuring a workpiece or a machine tool for machining a workpiece, a method for reducing errors of a rotary device comprising a first part and a second part which is rotatable relative to the first part about an axis of rotation of the rotary device, and a rotational position measuring device for measuring rotational positions of the first part and the second part relative to one another, wherein the rotational position measuring device comprises a rotational position sensor and a measurement body interacting with the rotational position sensor for measuring the rotational position, wherein the rotational position sensor is connected to one of the first part and the second part and the measurement body is connected to the other of the first part and the second part; the method comprising the following steps:
   determining error measurement values for measured errors of the rotary device due to deviations between, firstly, actual positions and actual alignments of the axis of rotation and, secondly, corresponding ideal positions and an ideal alignment of an ideal axis of rotation of the rotary device over a range of rotary angles corresponding to a plurality of different rotational positions of the first part and the second part relative to one another,
   establishing expected variations in a radial position of the first part or of the second part of the rotary device and/or expected variations in a position of the first part or of the second part relative to a direction tangential to the rotational direction of the rotary device, from the error measurement values for a plurality of rotational position measurement locations of the rotational position sensor at which rotational position measurement locations the rotational position sensor can measure the rotational position of the rotary device,
   establishing at least one rotational position measurement location of the rotational position sensor in accordance with the expected variations, for which expected variations relative to the direction tangential to the rotational direction of the rotary device—
      are smaller than for other possible rotational position measurement locations and/or
      satisfy a predetermined condition.

2. The method as claimed in claim 1, wherein an angular position of the rotational position measurement location in respect of the axis of rotation is established taking into account the expected variations.

3. The method as claimed in claim 1, wherein an axial position of the rotational position measurement location in respect of the axis of rotation is established taking into account the expected variations.

4. The method as claimed in claim 1, wherein the rotary device is part of a coordinate measuring machine, and a workpiece is measured by means of the coordinate measuring machine.

5. The method as claimed in claim 1, wherein the rotary device is part of a machine tool, and a workpiece is machined by means of the machine tool.

6. The method as claimed in claim 1, wherein the rotary device is used to turn a workpiece before, during and/or after measuring the workpiece by means of a coordinate measuring machine or machining of the workpiece by means of a machine tool.

7. A machine arrangement comprising a coordinate measuring machine for measuring a workpiece or a machine tool for machining a workpiece, and a rotary device having a first part and a second part which is rotatable relative to the first part about an axis of rotation of the rotary device, and a rotational position measuring device for measuring rotational positions of the first part and the second part relative to one another, wherein the rotational position measuring device comprises a rotational position sensor and a measurement body interacting with the rotational position sensor for measuring said rotational positions, wherein the rotational position sensor is connected to one of the first part and the second part and the measurement body is connected to the other of the first part and the second part; the machine arrangement further comprising:
   a measuring arrangement, configured to measure errors of the rotary device due to deviations between, firstly, actual positions and actual alignments of the axis of rotation and, secondly, corresponding ideal positions and an ideal alignment of an ideal axis of rotation of the rotary device over a range of rotary angles corresponding to a plurality of different rotational positions of the first part and the second part relative to one another, and to output corresponding error measurement values to a prediction apparatus,
   the prediction apparatus being configured to establish expected variations in a radial position of the first part or of the second part of the rotary device and/or expected variations in a position of the first part or of the second part relative to a direction tangential to the rotational direction of the rotary device which variations are expected as a result of a deviation of the rotational movement of the rotary device from an ideal rotational movement about the ideal axis of rotation, from the error measurement values for a plurality of rotational position measurement locations of the rotational position sensor at which rotational position measurement locations the rotational position sensor can measure the rotational position of the rotary device, and
   an establishment apparatus, configured to establish at least one rotational position measurement location of the rotational position sensor in accordance with the expected deviations, for which expected variations relative to the direction tangential to the rotational direction of the rotary device—
      are smaller than for other possible rotational position measurement locations and/or
      satisfy a predetermined condition.

8. The machine arrangement as claimed in claim 7, wherein the prediction apparatus is configured to establish an angular position of the rotational position measurement location in respect of the axis of rotation taking into account the expected variations.

9. The machine arrangement as claimed in claim 7, wherein the prediction apparatus is configured to establish an axial position of the rotational position measurement location in respect of the axis of rotation taking into account the expected variations.

10. The machine arrangement as claimed in claim 7, wherein the rotary device is part of a coordinate measuring machine for measuring a workpiece, part of a machine tool for machining a workpiece, or is configured to turn a workpiece before, during and/or after the measuring of the workpiece by means of the coordinate measuring machine or the machining of the workpiece by means of the machine tool.

11. In the operation of a coordinate measuring machine for measuring a workpiece or a machine tool for machining a workpiece, a method for reducing errors of a rotary device when determining coordinates of a workpiece or when machining a workpiece, wherein the rotary device enables a rotational movement of the workpiece about an axis of rotation of the rotary device when determining the coordinates of the workpiece or when machining the workpiece; the method comprising the following steps:

determining error measurement values for measured errors of the rotary device due to deviations between, firstly, actual positions and actual alignments of the axis of rotation and, secondly, corresponding ideal positions and an ideal alignment of the axis of rotation over a range of rotary angles corresponding to a plurality of different rotational positions of two parts, which have rotational movability about the axis of rotation, of the rotary device relative to one another, establishing filtered expected error values of the rotary device from the error measurement values, which expected error values are expected for a plurality of relative work positions and work alignments of, firstly, a coordinate measuring apparatus for determining the coordinates of the workpiece or a machining tool of a machine tool for machining the workpiece and, secondly, the rotary device, wherein the filtered expected error values are obtained by filtering over at least one predetermined range of deviations between, firstly, actual positions and actual alignments of the axis of rotation and, secondly, corresponding ideal positions and an ideal alignment of the axis of rotation over a complete revolution or part of a revolution of the rotary device, and establishing at least one work position and/or work alignment of the coordinate measuring apparatus or of the machining tool from the filtered expected error values of the rotary device, for which the filtered expected error value of the rotary device in the case of a predetermined measurement task for determining coordinates of the workpiece or a predetermined machining task for machining the workpiece—
is smaller than for other work positions and/or work alignments and/or
satisfies a predetermined condition.

12. The method as claimed in claim 11, wherein the at least one work position and/or work alignment established from the filtered expected error values of the rotary device is output to a controller of the coordinate measuring apparatus or of the machine tool.

13. The method as claimed in claim 11, wherein the at least one work position and/or work alignment is established by simulating the coordinate measurement or the machining of the workpiece.

14. The method as claimed in claim 11, wherein the establishment of the at least one work position and/or work alignment is based on a measurement task, according to which a surface of the workpiece is sensed by scanning.

15. A machine arrangement comprising a coordinate measuring machine for measuring a workpiece or a machine tool for machining a workpiece, and a rotary device that enables a rotational movement of the workpiece about an axis of rotation of the rotary device when determining the coordinates of the workpiece or when machining the workpiece; the machine arrangement further comprising:

a measuring arrangement, configured to measure errors of the rotary device due to deviations between, firstly, actual positions and actual alignments of the axis of rotation and, secondly, corresponding ideal positions and an ideal alignment of the axis of rotation over a range of rotary angles corresponding to a plurality of different rotational positions of two parts, which have rotational movability about the axis of rotation, of the rotary device relative to one another, and to output corresponding error measurement values to a prediction apparatus, the prediction apparatus being configured to establish filtered expected error values of the rotary device from the error measurement values, which expected error values are expected for a plurality of relative work positions and work alignments of, firstly, the coordinate measuring machine or the machine tool and, secondly, the rotary device, the filtered expected error values being obtained by filtering over at least one predetermined range of deviations between, firstly, actual positions and actual alignments of the axis of rotation and, secondly, corresponding ideal positions and an ideal alignment of the axis of rotation over a complete revolution or part of a revolution of the rotary device, and an establishment apparatus, configured to establish at least one work position and/or work alignment of the coordinate measuring machine or of the machine tool from the filtered expected error values of the rotary device, for which the filtered expected error value of the rotary device in the case of a predetermined measurement task for determining coordinates of the workpiece or a predetermined machining task for machining the workpiece—
is smaller than for other work positions and/or work alignments and/or
satisfies a predetermined condition.

16. The machine arrangement as claimed in claim 15, wherein the establishment apparatus is connected to a controller of the coordinate measuring machine or of the machine tool such that the controller can control a measurement of coordinates of the workpiece or the machining of the workpiece in accordance with the established at least one work position and/or work alignment of the coordinate measuring machine or of the machine tool, respectively.

* * * * *

UNITED STATES PATENT AND TRADEMARK OFFICE
CERTIFICATE OF CORRECTION

PATENT NO. : 10,073,435 B2
APPLICATION NO. : 15/041111
DATED : September 11, 2018
INVENTOR(S) : Rainer Sagemueller et al.

Page 1 of 1

It is certified that error appears in the above-identified patent and that said Letters Patent is hereby corrected as shown below:

On the Title Page

Item (54) and in the Specification, Column 1, Line 1 Title "ROTATORY" should read --ROTARY--.

Signed and Sealed this
First Day of January, 2019

Andrei Iancu
*Director of the United States Patent and Trademark Office*